United States Patent
Van et al.

(10) Patent No.: US 11,026,190 B2
(45) Date of Patent: Jun. 1, 2021

(54) METHOD FOR CONTROLLING POWER IN 5G COMMUNICATION AND ELECTRONIC DEVICE THEREFOR

(71) Applicant: Samsung Electronics Co., Ltd., Gyeonggi-do (KR)

(72) Inventors: Juho Van, Gyeonggi-do (KR); Sangmin Jung, Gyeonggi-do (KR); Hyunsang Kang, Gyeonggi-do (KR); Jooseung Kim, Gyeonggi-do (KR); Yongjun An, Gyeonggi-do (KR); Youngmin Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/851,630

(22) Filed: Apr. 17, 2020

(65) Prior Publication Data
US 2020/0336996 A1  Oct. 22, 2020

(30) Foreign Application Priority Data
Apr. 19, 2019  (KR) .................. 10-2019-0046270

(51) Int. Cl.
*H04W 52/34* (2009.01)
*H04W 72/04* (2009.01)

(52) U.S. Cl.
CPC ....... *H04W 52/34* (2013.01); *H04W 72/0453* (2013.01)

(58) Field of Classification Search
CPC . H04W 52/34; H04W 72/0453; H04W 52/52; H04W 52/247; H04W 52/146; H04W 88/06; H04W 52/50; H04W 52/243
(Continued)

(56) References Cited

U.S. PATENT DOCUMENTS 8,818,305 B1 * 8/2014 Schwent ............... H03F 1/0227
                                                                455/127.5
10,085,208 B2    9/2018 Maheshwari et al.
(Continued)

FOREIGN PATENT DOCUMENTS

EP         3 425 808      1/2019
KR      1020170104238     9/2017
(Continued)

OTHER PUBLICATIONS

International Search Report dated Aug. 6, 2020 issued in counterpart application No. PCT/KR2020/005178, 4 pages.
(Continued)

*Primary Examiner* — Eugene Yun
(74) *Attorney, Agent, or Firm* — The Farrell Law Firm, P.C.

(57) ABSTRACT

A method and an electronic device are provided for controlling power of the electronic device. Uplink resource information allocated to the electronic device from a base station is received via a first wireless communication circuit configured to transmit and/or receive a first signal of 6 GHz or less. A power modulator of the electronic device controls a power of at least one wireless communication circuit, from among the first wireless communication circuit and a second wireless communication circuit configured to transmit and/or receive a second signal of 6 GHz or less, with APT based on at least the number of uplink resource blocks indicated by the uplink resource information.

10 Claims, 15 Drawing Sheets

(58) Field of Classification Search
USPC .................................................... 455/522
See application file for complete search history.

(56) References Cited

U.S. PATENT DOCUMENTS

| | | | |
|---|---|---|---|
| 10,171,037 B2 | 1/2019 | Khlat | |
| 10,439,789 B2 | 10/2019 | Brunel et al. | |
| 2012/0176923 A1 | 7/2012 | Hsu et al. | |
| 2013/0043944 A1 | 2/2013 | Jones | |
| 2013/0059546 A1 | 3/2013 | Lum et al. | |
| 2013/0088291 A1 | 4/2013 | Gorisse | |
| 2013/0106378 A1 | 5/2013 | Khlat | |
| 2013/0187711 A1 | 7/2013 | Goedken et al. | |
| 2013/0238913 A1 | 9/2013 | Huang et al. | |
| 2015/0022271 A1* | 1/2015 | Winiecki | H03F 1/0216 330/297 |
| 2015/0119098 A1 | 4/2015 | Hsu et al. | |
| 2015/0194884 A1 | 7/2015 | Levesque et al. | |
| 2015/0235707 A1 | 8/2015 | Lee et al. | |
| 2016/0173031 A1* | 6/2016 | Langer | H03F 1/0222 330/126 |
| 2017/0041804 A1 | 2/2017 | Goedken et al. | |
| 2017/0347273 A1 | 11/2017 | Goedken et al. | |
| 2018/0063783 A1 | 3/2018 | Maheshwari et al. | |
| 2018/0309409 A1 | 10/2018 | Khlat | |
| 2018/0323947 A1 | 11/2018 | Brunel et al. | |
| 2019/0115873 A1 | 4/2019 | Khlat | |
| 2019/0222181 A1* | 7/2019 | Khlat | H03F 3/20 |
| 2020/0099502 A1 | 3/2020 | Brunel et al. | |
| 2020/0120483 A1* | 4/2020 | Chikkala | H04W 12/06 |
| 2020/0186400 A1 | 6/2020 | Lee et al. | |

FOREIGN PATENT DOCUMENTS

| | | |
|---|---|---|
| WO | WO 2012/151594 | 11/2012 |
| WO | WO 2014/078103 | 5/2014 |

OTHER PUBLICATIONS

European Search Report dated Sep. 9, 2020 issued in counterpart application No. 20170188.5-1212, 23 pages.

\* cited by examiner

METHOD FOR CONTROLLING POWER IN 5G COMMUNICATION AND ELECTRONIC DEVICE THEREFOR

CROSS-REFERENCE TO RELATED APPLICATION(S)

This application is based on and claims priority under 35 U.S.C. § 119(a) to Korean Patent Application No. 10-2019-0046270, filed on Apr. 19, 2019, in the Korean Intellectual Property Office, the disclosure of which is incorporated by reference herein in its entirety.

BACKGROUND

1. Field

The disclosure relates to a method for controlling power in legacy and $5^{th}$ generation (5G) communication and an electronic device therefor.

2. Description of Related Art

An electronic device may support cellular communication. For example, the cellular communication may use a wireless protocol according to a communication standard specified by $3^{rd}$ generation partnership project (3GPP). With the development of the communication standard, the range of a frequency band used by the electronic device has increased.

The electronic device may simultaneously transmit a plurality of signals corresponding to a plurality of frequency bands to increase the transmission rate of data transmitted through an uplink. The efficiency of radio resource use and scheduling flexibility may be increased through simultaneous transmission in a plurality of frequency bands that are continuous or non-continuous. For example, the electronic device may utilize a plurality of frequency bands belonging to the same radio access technology (RAT) or may utilize a plurality of frequency bands belonging to different RATs.

An electronic device may simultaneously perform uplink transmission using a plurality of frequency bands. The transmission of the signal in the first band of the electronic device may operate as interference to the signal in the second band of the electronic device. For example, the harmonic component in the first band signal may correspond to at least part of the second band. The electronic device may reduce the maximum transmission power to reduce signal interference. The limitation of the maximum transmission power may reduce the uplink transmission quality of the electronic device.

The electronic device may transmit a signal using the first band and may receive a signal using the second band at the same time. The harmonic component of the first band transmission signal may operate as the interference to the reception of the second band signal. For example, the harmonic component of the first band signal may cause reception sensitivity degradation (e.g., desense) of the second band signal.

SUMMARY

In accordance with an aspect of the disclosure, an electronic device is provided that includes a housing, a first antenna, a second antenna, a first wireless communication circuit electrically connected to the first antenna and configured to transmit and/or receive a first signal having a first frequency between 500 MHz and 6 GHz. The electronic device also includes a first power modulator included in the first wireless communication circuit or connected to the first wireless communication circuit and configured to provide the first wireless communication circuit with a first voltage based on envelope tracking (ET) or average power tracking (APT). The electronic device additionally includes a second wireless communication circuit electrically connected to the second antenna and configured to transmit and/or receive a second signal having a second frequency between 500 MHz and 6 GHz, and a second power modulator included in the second wireless communication circuit or connected to the second wireless communication circuit and providing the second wireless communication circuit with a second voltage based on the ET or the APT. The electronic device further includes at least one processor operatively connected to the first wireless communication circuit and the second wireless communication circuit, and a memory operatively connected to the at least one processor or coupled with the at least one processor. The memory may store one or more instructions that, when executed, cause the at least one processor to receive uplink resource information allocated to the electronic device from a base station, via the first wireless communication circuit, and to cause at least one power modulator, from among the first power modulator and the second power modulator to provide a voltage based on the APT, based on at least a number of uplink resource blocks indicated by the uplink resource information.

In accordance with another aspect of the disclosure, a method is provided for controlling power of an electronic device. Uplink resource information allocated to the electronic device from a base station is received via a first wireless communication circuit configured to transmit and/or receive a first signal of 6 GHz or less. A power modulator of the electronic device controls a power of at least one wireless communication circuit, from among the first wireless communication circuit and a second wireless communication circuit configured to transmit and/or receive a second signal of 6 GHz or less, with APT based on at least the number of uplink resource blocks indicated by the uplink resource information.

BRIEF DESCRIPTION OF THE DRAWINGS

The above and other aspects, features, and advantages of the disclosure will be more apparent from the following detailed description when taken in conjunction with the accompanying drawings, in which.

DETAILED DESCRIPTION

Figure 1:
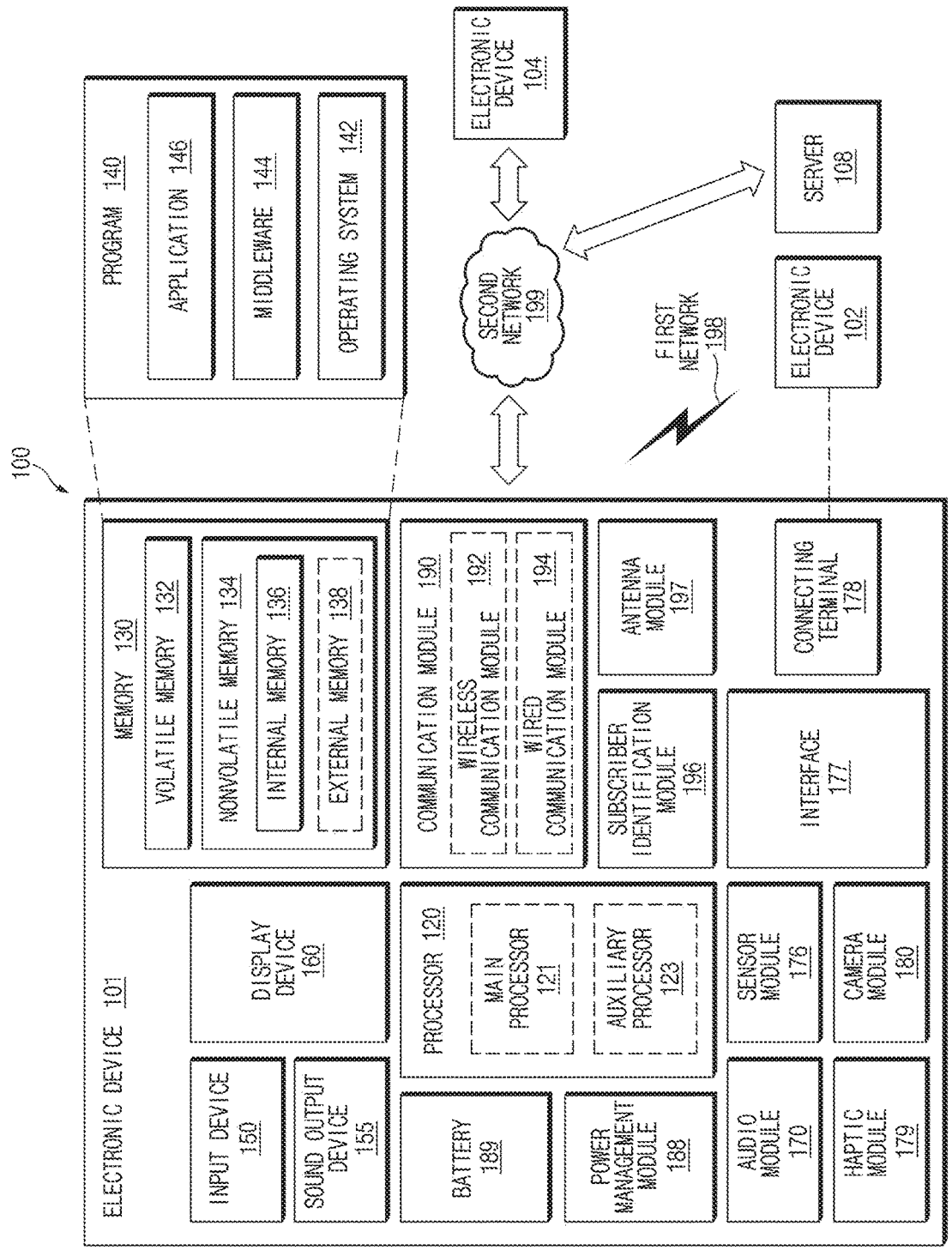
FIG. 1 illustrates a block diagram of an electronic device in a network, according to an embodiment.

Hereinafter, embodiments of the disclosure are described in detail with reference to accompanying drawings. The same or similar components may be designated by the same or similar reference numerals although they are illustrated in different drawings. Detailed descriptions of constructions or processes known in the art may be omitted to avoid obscuring the subject matter of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit and/or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
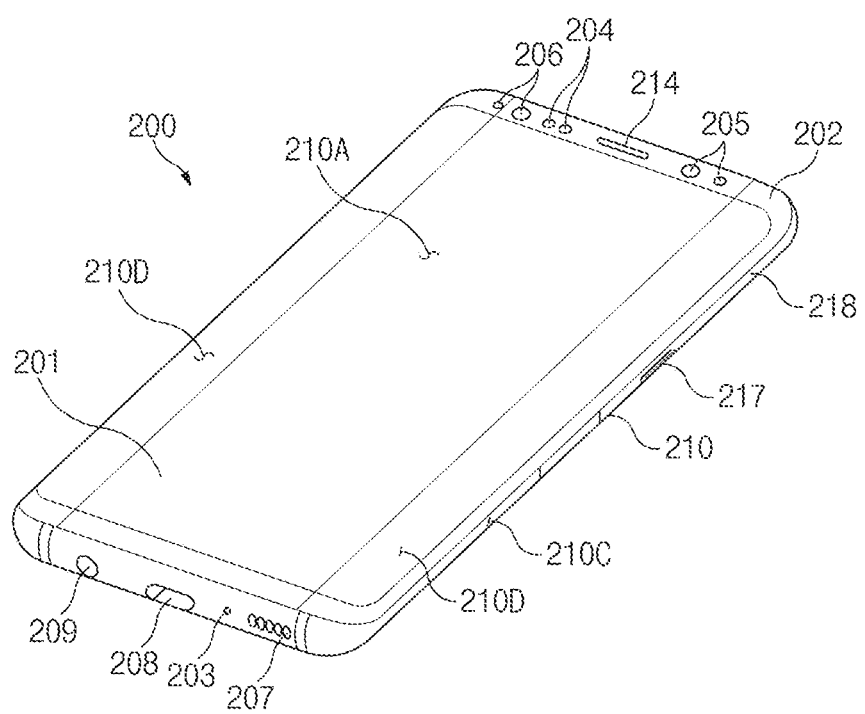
FIG. 2 is a diagram illustrating a perspective view of a mobile electronic device, according to various embodiments.
Figure 3:
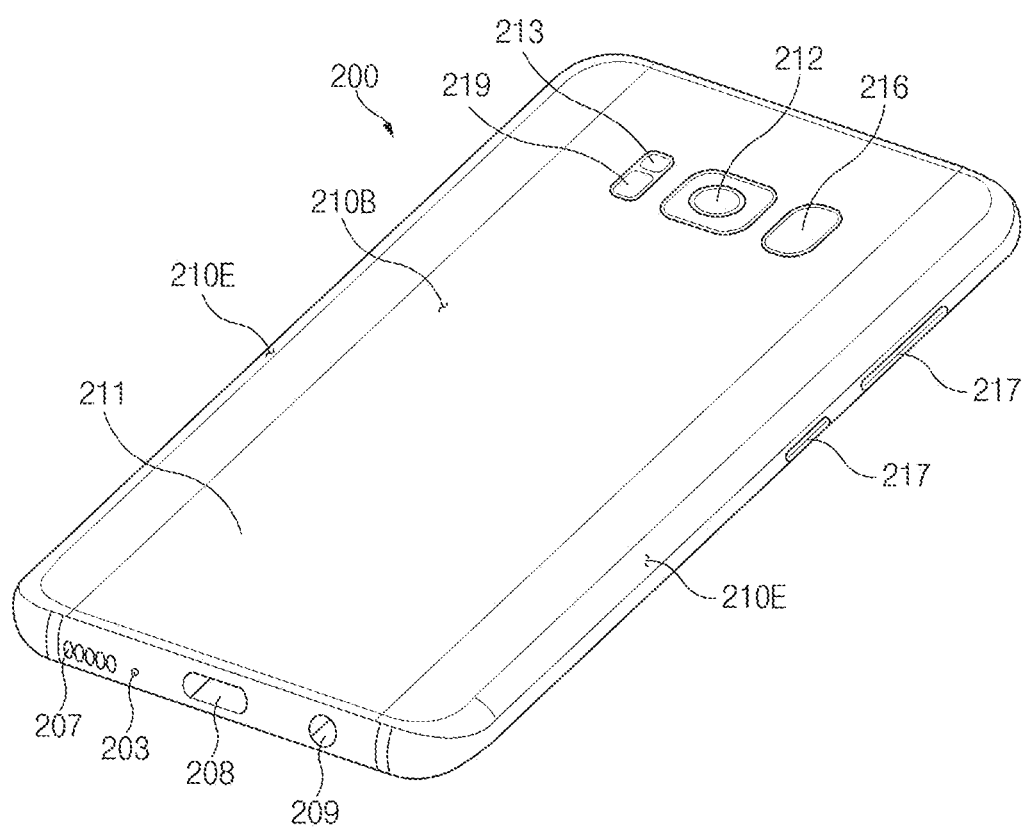
FIG. 3 is a diagram illustrating a perspective view of a rear surface of an electronic device, according to an embodiment.

FIG. 2 is a diagram illustrating a perspective view of a front surface of an electronic device, according to an embodiment. FIG. 3 is a diagram illustrating a perspective view of a rear surface of an electronic device, according to an embodiment.

Referring to FIGS. 2 and 3, a mobile electronic device 200 (e.g., the electronic device 101 of FIG. 1) includes a housing 210 having a first surface (or a front surface) 210A, a second surface (or a rear surface) 210B, and a side surface 210C surrounding a space between the first surface 210A and the second surface 210B. The housing may be referred to as a "structure" which forms a part of the first surface 210A, the second surface 210B, and side surfaces 210C. The first surface 210A is formed by a first plate (or a front plate) 202 (e.g., a glass plate including various coating layers, or a polymer plate), at least a portion of which is substantially transparent. The second surface 210B is formed by a rear plate 211, which is substantially opaque. For example, the rear plate 211 may be implemented with a coated or colored glass, a ceramic, a polymer, a metal (e.g., aluminum, stainless steel (STS), or magnesium), or a combination of at least two of the materials. The side surface 210C is coupled with the front plate 202 and the rear plate 211, and may be formed by a side bezel structure (or a "side member") 218 including metal and/or polymer. The rear plate 211 and the side bezel structure 218 may be integrally formed and may include the same material (e.g., a metal material such as aluminum).

The front plate 202 includes two first regions 210D, which are bent toward the rear plate 211 from the first surface 210A so as to be seamlessly extended, at opposite long edges of the front plate 202. Referring to FIG. 3, the rear plate 211 includes two second regions 210E, which are bent toward the front plate 202 from the second surface 210B so as to be seamlessly extended, at opposite long edges thereof. The front plate 202 (or the rear plate 211) may include only one of the first regions 210D (or the second regions 210E). A portion of the first regions 210D or the second regions 210E may not be included. When viewed from the side surface of the electronic device 200, the side bezel structure 218 may have a first thickness (or width) on one side where the first region 210D or the second region 210E are not included, and may have a second thickness on one side where the first region 210D or the second region 210E are included. The second thickness may be smaller than the first thickness.

The electronic device 200 includes a display 201, an audio module 203, 207, 214, a sensor module 204, 216, 219, a camera module 205, 212, 213, key input devices 217, a light-emitting device 206, and a connector hole 208, 209. The electronic device 200 may not include at least one (e.g., the key input devices 217 or the light-emitting device 206) of the components or may include at least one additional component.

The display 201 may be exposed through a considerable portion of the front plate 202. At least part of the display 201 may be exposed through the first surface 210A and the front plate 202 forming the first region 210D of the side surface 210C. A corner of the display 201 may be formed to be mostly identical to a shape of an outer portion of the front plate 202 adjacent thereto. To increase the area where the display 201 is exposed, a difference between an outer portion of the display 201 and an outer portion of the front plate 202 may be formed mostly identically.

A recess or an opening may be formed in a portion of a screen display region of the display 201, and at least one or more of the audio module 214, the sensor module 204, the camera module 205, and the light-emitting device 206 may be aligned with the recess or the opening. At least one or more of the audio module 214, the sensor module 204, the camera module 205, the fingerprint sensor 216, and the light-emitting device 206 may be provided on a back surface of the display 201, which corresponds to the screen display region. The display 201 may be combined with a touch sensing circuit, a pressure sensor capable of measuring the intensity (or pressure) of a touch, and/or a digitizer capable of detecting a magnetic stylus pen or may be disposed adjacent thereto. At least part of the sensor module 204, 219 and/or at least part of the key input device 217 may be disposed in the first region 210D and/or the second region 210E.

The audio module 203, 207, 214 includes a microphone hole 203 and a speaker hole 207, 214. A microphone for obtaining external sound may be disposed inside the microphone hole 203. A plurality of microphones may be disposed inside the microphone hole 203. The speaker hole 207, 214 includes the external speaker hole 207 and the receiver hole 214 for making a call. The speaker hole 207, 214 and the microphone hole 203 may be implemented with one hole, or a speaker (e.g., a piezo speaker) may be included without the speaker hole 207, 214.

The sensor module 204, 216, 219 may generate an electrical signal or a data value corresponding to an internal operation state of the electronic device 200 or corresponding to an external environment state. The sensor module 204, 216, 219 includes a first sensor module 204 (e.g., a proximity sensor) and/or a second sensor module (e.g., a fingerprint sensor) disposed on the first surface 210A of the housing 210, and/or a third sensor module 219 (e.g., a heart rate monitor (HRM) sensor) and/or a fourth sensor module 216 (e.g., a fingerprint sensor) disposed on the second surface 210B of the housing 210. The fingerprint sensor may be positioned on the second surface 210B as well as the first surface 210A (e.g., the display 201) of the housing 210. The electronic device 200 may further include at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illumination sensor 204.

The camera module 205, 212, 213 includes a first camera device 205 positioned on the first surface 210A of the electronic device 200, and a second camera module 212 and/or a flash 213 positioned on the second surface 210B. The camera module 205, 212 may include one or more lenses, an image sensor, and/or an ISP. The flash 213 may include, for example, a light emitting diode or a xenon lamp. In an embodiment, two or more lenses (e.g., an infrared camera and wide-angle and telephoto lenses) and image sensors may be disposed on one surface of the electronic device 200.

The key input devices 217 are disposed on the side surface 210C of the housing 210. The electronic device 200 may not include all or a part of the key input devices 217, and a key input device 217 not included may be implemented on the display 201 in the form of a soft key. A key input device may include the sensor module 216 disposed on the second surface 210B of the housing 210.

The light-emitting device 206 is disposed on the first surface 210A of the housing 210. The light-emitting device 206 may provide status information of the electronic device 200, for example, in the form of light. The light-emitting device 206 may provide, for example, a light source that operates in conjunction with an operation of the camera module 205. The light-emitting device 206 may include, for example, a light-emitting diode (LED), an IR LED, and a xenon lamp.

The connector hole 208, 209 includes a first connector hole 208 that is capable of accommodating a connector (e.g., a USB connector) for transmitting/receiving a power and/or data to/from an external electronic device, and a second connector hole (or an earphone jack) 209 that is capable of accommodating a connector for transmitting/receiving an audio signal to/from the external electronic device.

Figure 4:
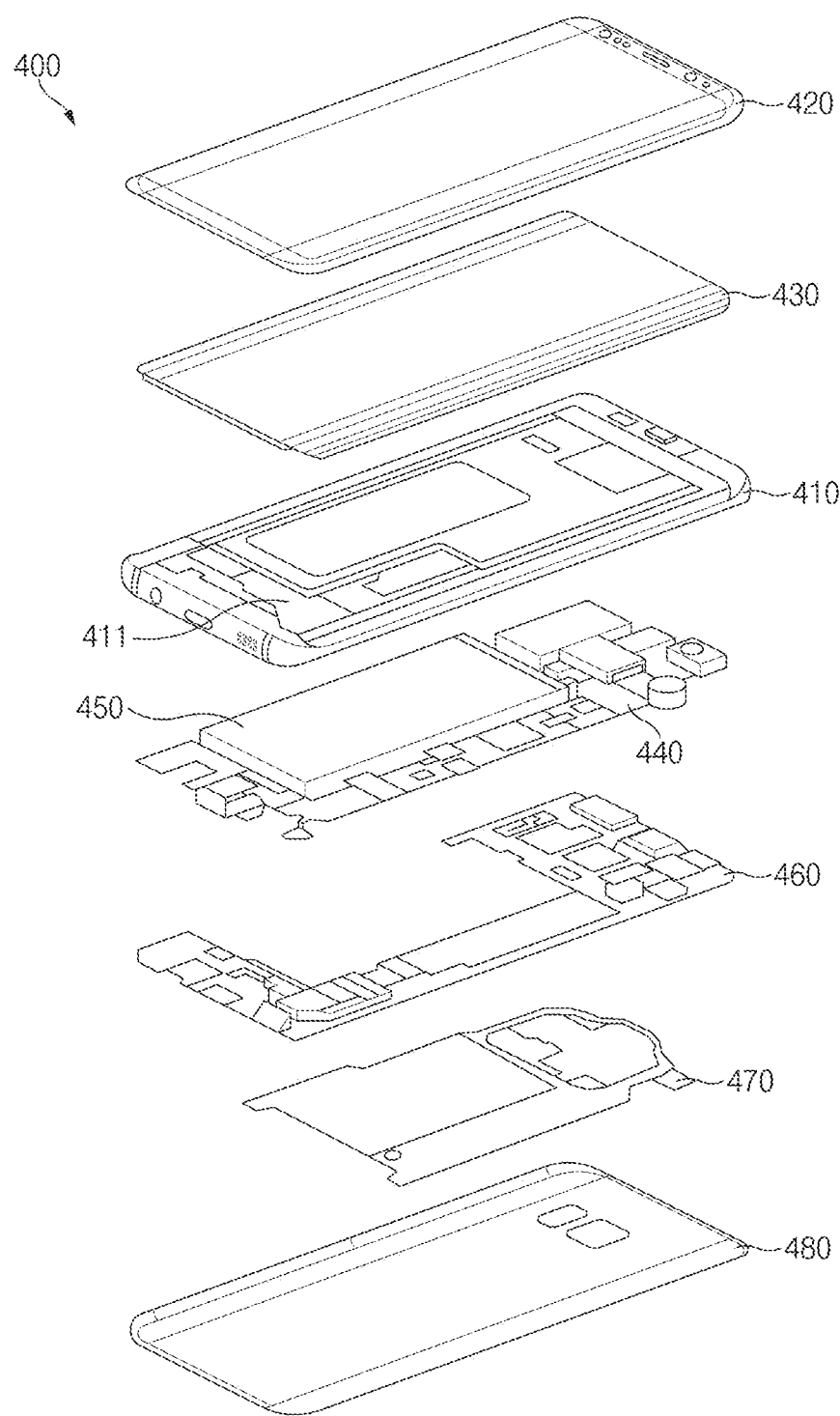
FIG. 4 is a diagram illustrating an exploded perspective view of a mobile electronic device, according to an embodiment.

FIG. 4 is a diagram illustrating an exploded perspective view of a mobile electronic device, according to an embodiment.

Referring to FIG. 4, a mobile electronic device 400 (e.g., the mobile electronic device 200 of FIG. 2) includes a side bezel structure 410, a first support member 411 (e.g., a bracket), a front plate 420, a display 430, a PCB 440, a battery 450, a second support member 460 (e.g., a rear case), an antenna 470, and a rear plate 480. The electronic device 400 may not include at least one (e.g., the first support member 411 or the second support member 440) of the components or may include at least one additional component. At least one of the components of the electronic device 400 may be identical or similar to at least one of the components of the electronic device 200 of FIG. 2 or 3, and thus, additional description will be omitted to avoid redundancy.

The first support member 411 is disposed inside the electronic device 400, and may be connected to the side bezel structure 410 or may be integrally formed with the side bezel structure 410. The first support member 411 may be formed of, for example, a metal material and/or a nonmetal material (e.g., polymer). The display 430 is coupled with one surface of the first support member 411, and the PCB 440 is coupled with an opposite surface of the first support member 411. A processor, a memory, and/or an interface may be mounted on the PCB 440. For example, the processor may include one or more of a CPU, an AP, a GPU, an ISP, a sensor hub processor, or a CP.

Figure 5:
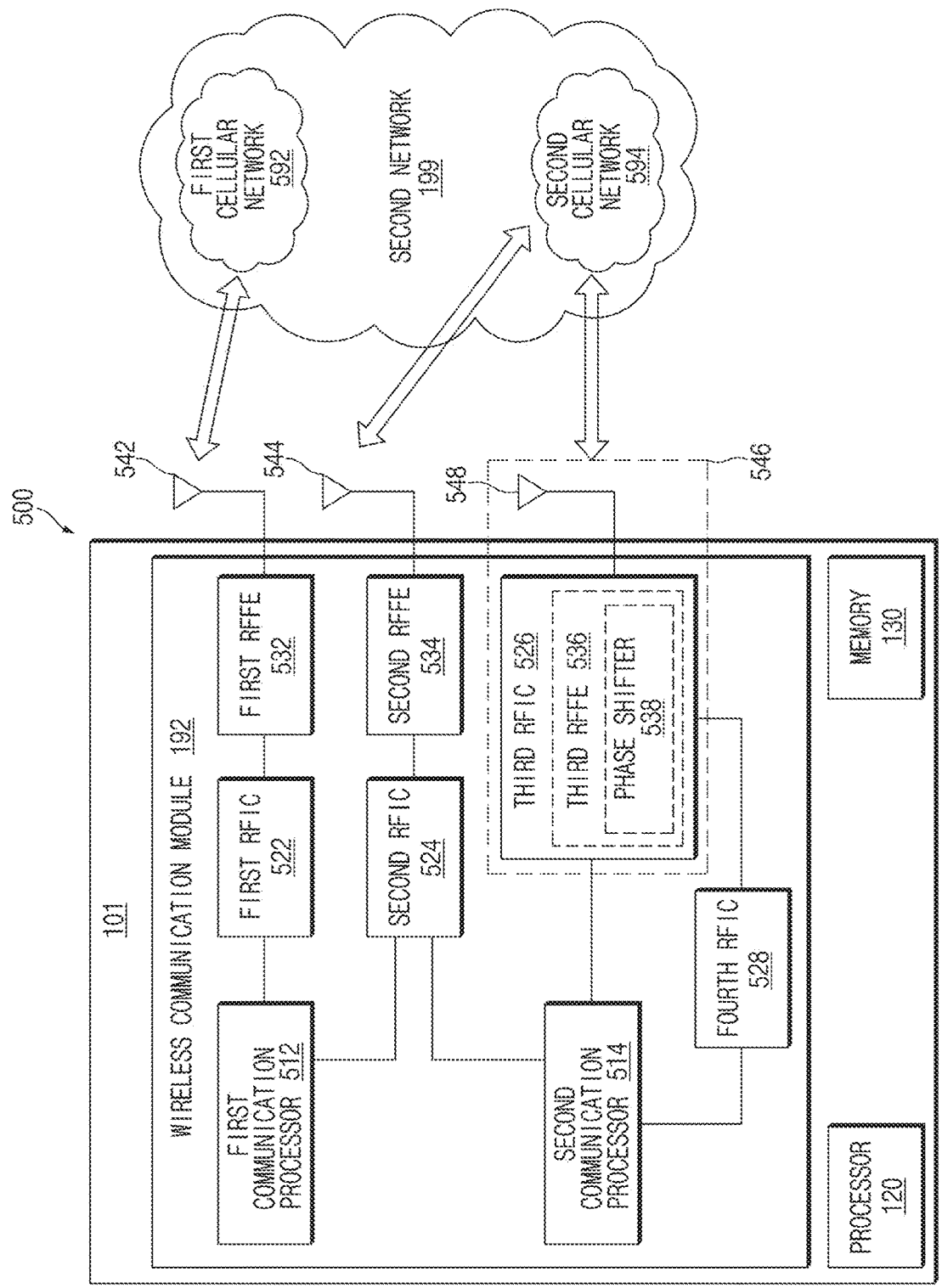
FIG. 5 is a block diagram illustrating an electronic device for supporting legacy network communication and 5G network communication, according to an embodiment.

FIG. 5 is a block diagram illustrating an electronic device for supporting legacy network communication and 5G network communication, according to an embodiment. An electronic device 101 of block diagram 500 includes a first communication processor (CP) 512, a second communication processor (CP) 514, a first radio frequency integrated circuit (RFIC) 522, a second RFIC 524, a third RFIC 526, a fourth RFIC 528, a first radio frequency front end (RFFE) 532, a second RFFE 534, a first antenna module 542, a second antenna module 544, and an antenna 548. The electronic device 101 further includes the processor 120 and the memory 130. The second network 199 includes a first cellular network 592 and a second cellular network 594. The electronic device 101 may further include at least one of the components described in FIG. 1, and the second network 199 may include at least one other network. The first CP 512, the second CP 514, the first RFIC 522, the second RFIC 524, the fourth RFIC 528, the first RFFE 532, and the second RFFE 534 may form at least part of the wireless communication module 192. The fourth RFIC 528 may be omitted or included as the part of the third RFIC 526.

The first CP 512 may support the establishment of a communication channel of a band to be used for wireless communication with the first cellular network 592 and the legacy network communication through the established communication channel. The first cellular network 592 may be a legacy network including 2G, 3G, 4G, and/or long term evolution (LTE) network. The second CP 514 may support the establishment of a communication channel corresponding to a specified band (e.g., about 6 GHz~about 60 GHz) among bands to be used for wireless communication with the second cellular network 594 and 5G network communication via the established communication channel. The second cellular network 594 may be 5G network defined in 3GPP. Additionally, the first CP 512 or the second CP 514 may establish a communication channel for a specified band (e.g., about 6 GHz or lower) of the bands to be used for wireless communication with the second cellular network 594 and may support 5G network communication through the established communication channel. The first CP 512 and the second CP 514 may be implemented within a single chip or a single package. The first CP 512 or the second CP 514 may be implemented within a single chip or a single package with the processor 120, the auxiliary processor 123, or the communication module 190.

At the time of transmission, the first RFIC 522 may convert a baseband signal generated by the first CP 512 to a radio frequency (RF) signal of about 700 MHz to about 3 GHz used for the first cellular network 592 (e.g., a legacy network). At the time of reception, the RF signal may be obtained from the first cellular network 592 via an antenna (e.g., the first antenna module 542) and may be preprocessed via RFFE (e.g., the first RFFE 532). The first RFIC 522 may convert the pre-processed RF signal into a baseband signal so as to be processed by the first CP 512.

When transmitting a signal, the second RFIC 524 may convert a baseband signal generated by the first CP 512 or the second CP 514 into an RF signal (hereinafter referred to as a "5G Sub6 RF signal") in a Sub6 band (e.g., about 6 GHz or lower) used in the second cellular network 594 (e.g., a 5G network). At the time of reception, the 5G Sub6 RF signal may be obtained from the second cellular network 594 (e.g., 5G network) via an antenna (e.g., the second antenna module 544) and may be preprocessed via RFFE (e.g., the second RFFE 534). The second RFIC 524 may convert the pre-processed 5G Sub6 RF signal into a baseband signal so as to be processed by a CP corresponding to the 5G Sub6 RF signal from among the first CP 512 or the second CP 514.

The third RFIC 526 may convert a baseband signal generated by the second CP 514 into an RF signal (hereinafter referred to as a "5G Above6 RF signal") in a 5G Above6 band (e.g., approximately 6 GHz to approximately 60 GHz) to be used in the second network 594 (e.g., a 5G network). When receiving a signal, the 5G Above6 RF signal may be obtained from the second cellular network 594 through an antenna 548 and may be pre-processed through a third RFFE 536. For example, the third RFFE 536 may perform preprocessing of a signal, using a phase shifter 538. The third RFIC 526 may convert the preprocessed 5G Above 6 RF signal to a baseband signal so as to be processed by the second CP 514. The third RFFE 536 may be implemented as a part of the third RFIC 526.

The electronic device 101 may include the fourth RFIC 528 independent of the third RFIC 526 or as at least part thereof. In this case, the fourth RFIC 528 may convert the baseband signal generated by the second CP 514, to an RF signal (hereinafter referred to as an intermediate frequency (IF) signal) of an intermediate frequency band (e.g., about 9 GHz about 11 GHz) and then may transmit the IF signal to the third RFIC 526. The third RFIC 526 may convert the IF signal to the 5G Above6 RF signal. In the case of receiving a signal, the 5G Above6 RF signal may be received from the second cellular network 594 (e.g., a 5G network) through an antenna 548 and may be converted into an IF signal by the third RFIC 526. The fourth RFIC 528 may convert the IF signal into a baseband signal so as to be processed by the second CP 514.

The first RFIC 522 and the second RFIC 524 may be implemented with a part of a single chip or a single package. The first REFE 532 and the second REFE 534 may be implemented with a part of a single chip or a single package. At least one of the first antenna module 542 or the second antenna module 544 may be omitted or may be combined with any other antenna module to process RF signals in a plurality of bands.

The third RFIC 526 and the antenna 548 may be disposed at the same substrate to form a third antenna module 546. For example, the wireless communication module 192 or the processor 120 may be disposed on a first substrate (e.g., a main PCB). In this case, the third RFIC 526 may be disposed in a partial region (e.g., on a lower surface) of a second substrate (e.g., a sub PCB) independent of the first substrate, and the antenna 548 may be disposed in another partial region (e.g., on an upper surface) of the second substrate. As such, the third antenna module 546 may be formed. The antenna 548 may include an antenna array capable of being used for beamforming. It is possible to reduce the length of the transmission line between the third RFIC 526 and the antenna 548 by positioning the third RFIC 226 and the antenna 248 on the same substrate. The decrease in the transmission line may make it possible to reduce the loss (or attenuation) of a signal in a high-frequency band (e.g., approximately 6 GHz to approximately 60 GHz) used for the 5G network communication due to the transmission line. For this reason, the electronic device 101 may improve the quality or speed of communication with the second cellular network 594.

The second cellular network 594 (e.g., a 5G network) may be used independently of the first cellular network 592 (e.g., a legacy network) (e.g., stand-alone (SA)) or may be used in conjunction with the first cellular network 292 (e.g., non-stand alone (NSA)). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 101 may access the access network of the 5G network and may then access an external network (e.g., Internet) under control of the core network (e.g., an evolved packed core (EPC)) of the legacy network. Protocol information (e.g., LTE protocol information) for communication with the legacy network or protocol information (e.g., New Radio NR protocol information) for communication with the 5G network may be stored in the memory 530 and may be accessed by another component (e.g., the processor 120, the first CP 512, or the second CP 514).

Figure 6:
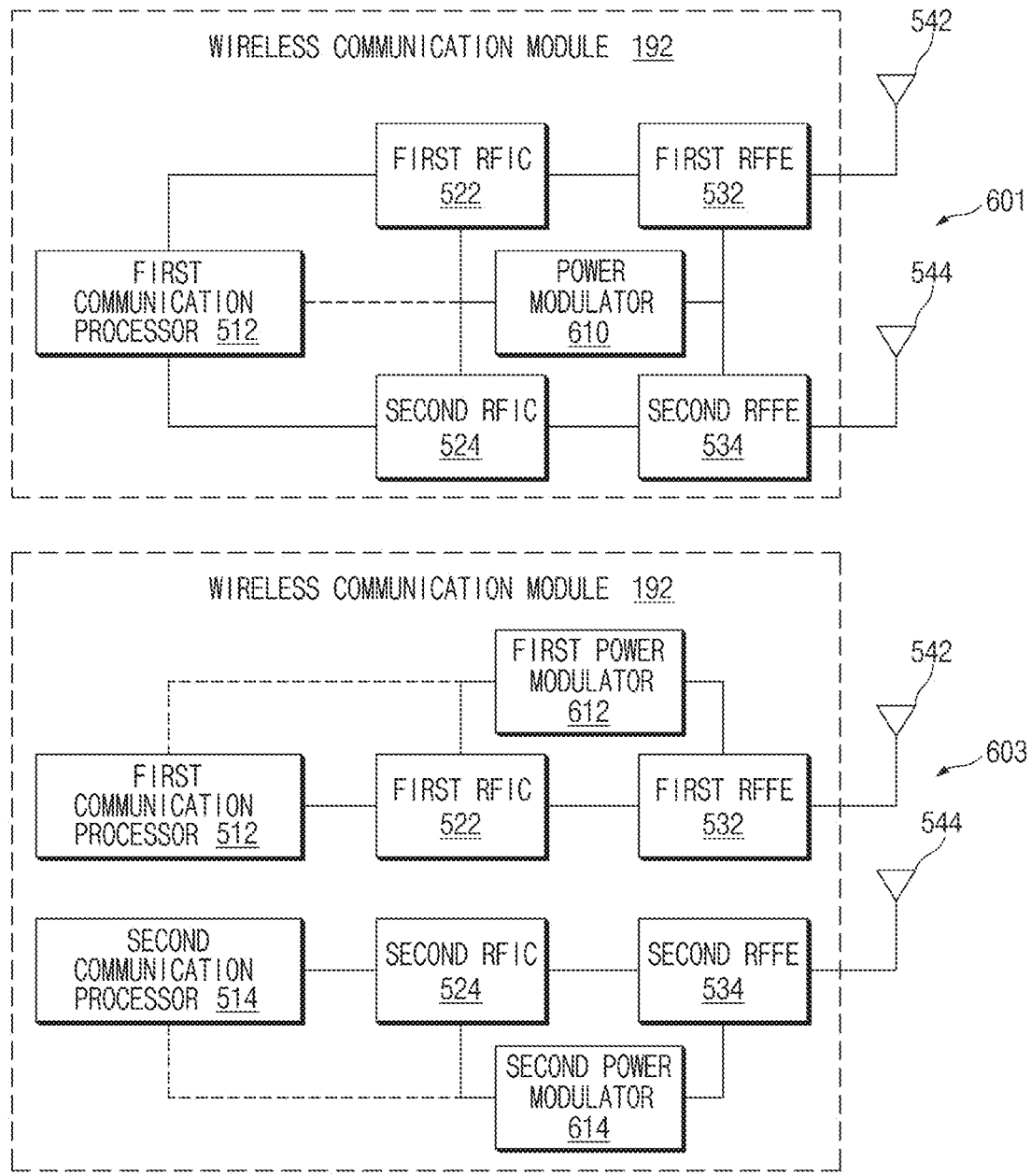
FIG. 6 is a block diagram illustrating a wireless communication module, according to an embodiment.

FIG. 6 is a block diagram illustrating a wireless communication module, according to an embodiment.

As shown with respect to 601, the wireless communication module 192 includes a power modulator 610 configured to control the power (e.g., voltage) applied to the first RFFE 532 and the second RFFE 534. For example, the power modulator 610 may control the power applied to the first RFFE 532 and the second RFFE 534, based on signals from the first CP 512, the first RFIC 522, and/or the second RFIC 524. The power modulator 610 may control the power applied to the first RFFE 532 under the control of the first CP 512 and/or the first RFIC 522. The power modulator 610 may control the power of the second RFFE 534 under the control of the first CP 512 and/or the second RFIC 524.

As shown with respect to 603, the wireless communication module 192 includes a first power modulator 612 configured to control the power (e.g., voltage) applied to the first RFFE 532 and a second power modulator 614 configured to control the power applied to the second RFFE 534. For example, the first power modulator 612 may control the power of the first RFFE 532 based on the signal from the first CP 512 and/or the first RFIC 522. The second power modulator 614 may control the power of the second RFFE 534 based on a signal from the second CP 514 and/or the second RFIC 524.

Herein, the operations of various electronic devices (e.g., the electronic device 101 of FIG. 1) are described based on the power modulator 610. For example, the description of the power modulator 610 may be identically applied to the first power modulator 610 and/or the second power modulator 620.

The power modulator 610 may operate depending on a plurality of operating modes. For example, in the first mode, the power modulator 610 may control the voltage applied to RFFE (e.g., the first RFFE 532 and/or the second RFFE 534) based on envelope tracking (ET). In the second mode, the power modulator 610 may control the voltage applied to RFFE based on average power tracking (APT). Hereinafter, the power applied to RFFE may be referred to as RFFE input voltage or RFFE input power.

Figure 7:
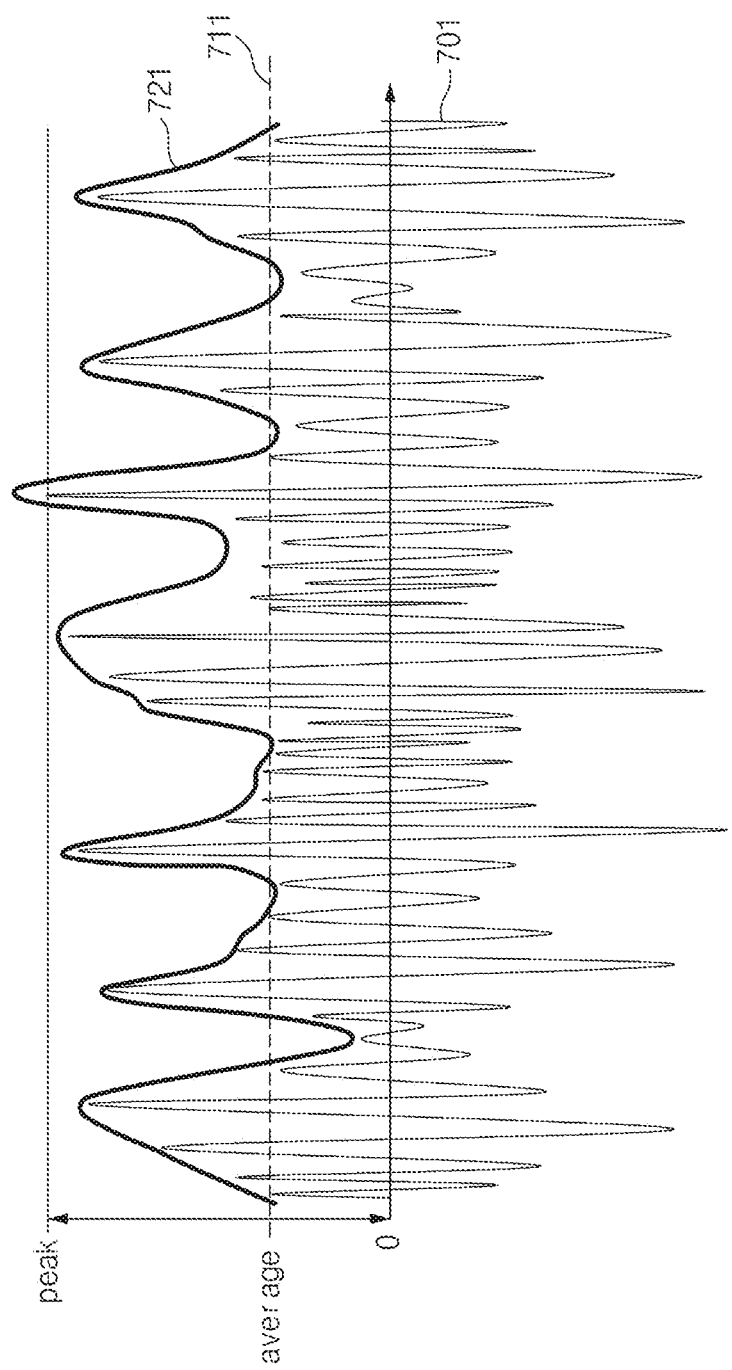
FIG. 7 is a diagram illustrating a power control method, according to an embodiment.

FIG. 7 is a diagram illustrating a power control method, according to an embodiment.

Referring to FIG. 7, when the power modulator 610 controls the transmission power based on APT, the power modulator 610 may be adjusted based on the average value of the power applied to RFFE (e.g., the first RFFE 532 and/or the second RFFE 534) of a transmission signal 701. For example, the power modulator 610 may determine the average power based at least partly on the average of the absolute values of the peak values of the transmission signal 701 and may control the RFFE input power based at least partly on an average power 711. In another example, the power modulator 610 may control the RFFE input power based on the set DC voltage. The power modulator 610 may determine the average value of transmission signals for each set time interval and may control the RFFE input power based at least partly on the determined average value. For example, the power modulator 610 may obtain a transmission signal from the first RFIC 552 and may control at least one RFFE input power of the first RFFE 532 based at least partly on the average value of transmission signals. The power modulator 610 may obtain a transmission signal from the second RFIC 554 and may control the RFFE input power of the second RFFE 532 based at least partly on the average value of transmission signals.

When the power modulator 610 controls the RFFE input power based on ET, the power modulator 610 may control the RFFE input power based on the peak value of the transmission signal. For example, the power modulator 610 may control the RFFE input power associated with the transmitting circuit depending on the required transmission power at each instant of transmission. The power modulator 610 may control the RFFE input power based at least partly on an envelope 721 formed by the peak values of the transmission signal. For example, the power modulator 610 may obtain a transmission signal from the first RFIC 552 and may control the input power of the first RFFE 532 based at least partly on the envelope 721 of the transmission signal. The power modulator 610 may obtain a transmission signal from the second RFIC 554 and may control the input power of the second RFFE 532 based at least partly on the envelope of the transmission signal.

Referring again to FIG. 5, the electronic device 101 may transmit and receive signals in a plurality of frequency bands.

The electronic device 101 may simultaneously transmit signals, using a plurality of frequency bands. For example, the electronic device 101 may substantially simultaneously transmit a signal, using the first band and the second band. For example, the first band and the second band may be frequency bands associated with the same radio access technology (RAT). In another example, the first band and the second band may be frequency bands associated with different RATs. In this case, at least part of the first band and the second band may overlap with each other on a frequency domain. When the first band and the second band have a specified relationship (e.g., when the multiplication number of the first band corresponds to the second band), the harmonic component of the signal transmitted by the electronic device 101 in the first band may cause the distortion in the signal in the second band.

According to E-UTRAN new radio-dual connectivity (EN-DC), the electronic device 101 may be connected to the first cellular network 592 using the first RFFE 532 and may be connected to the second cellular network 594 using the second RFFE 534. When the electronic device 101 communicates based on frequency division multiplexing (FDM), the electronic device 101 may transmit a signal substantially simultaneously using the first RFFE 532 and the second RFFE 534. The electronic device 101 may reduce the maximum transmission power to reduce intermodulation distortion (IMD). The electronic device 101 may further reduce the maximum transmission power based on the number of resource blocks allocated to the electronic device 101 (e.g., the magnitude of radio frequency resource allocated to the electronic device 101). For example, when additional maximum power reduction (MPR) is applied, the electronic device 101 may further reduce the maximum transmission power, further using the MPR value and additional MPR factor 'A'.

The electronic device 101 may determine the MPR value by subtracting a value, which is obtained by multiplying 'A' by a weight, from the specified MPR value. For example, the additional MPR factor 'A' may increase as the number of resource blocks allocated to the electronic device 101 increases. When the number of allocated resource blocks is relatively small, the MPR value may be relatively increased. For example, the MPR for a combination of the B41 band of the E-UTRAN and the n41 band of the NR may be shown in Table 1 below.

TABLE 1

| The number of RBs | A | Continuous RB | Non-continuous RB |
|---|---|---|---|
| | | MPR (dBm) | |
| 1 | 0.54 | 9 | 13 |
| 3 | 1.62 | 7 | 12 |
| 10 | 5.4 | 5 | 11 |

As shown in Table 1, the maximum transmission power may be reduced by up to 13 dBm. In this case, as the transmission power of the electronic device 101 is lowered, the error rate may be increased and the data throughput may be reduced. The electronic device 101 may change a transmission operating mode to improve transmitter linearity. The electronic device 101 may minimize the MPR by improving the transmitter linearity.

Figure 8:
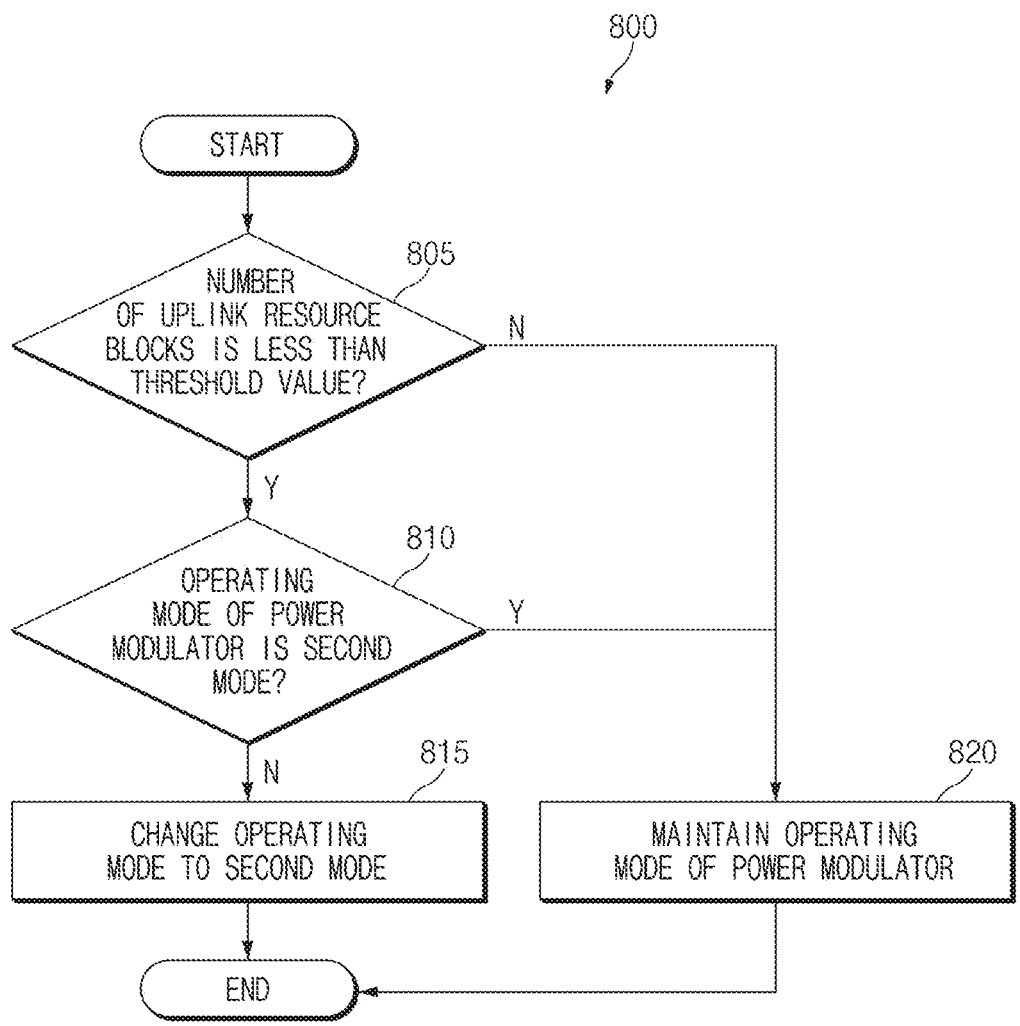
FIG. 8 is a flowchart illustrating a method of changing an operating mode of a power control circuit, according to an embodiment.

FIG. 8 is a flowchart illustrating a method of changing an operating mode of a power control circuit, according to an embodiment.

The processor (e.g., the first CP 512 in 601 of FIG. 6 or the first CP 512 and/or the second CP 514 in 602 of FIG. 6) of an electronic device 101 may perform the operations of FIG. 8. The processor of the electronic device may control the RFFE input power associated with at least one communication circuit (e.g., the first RFFE 532 and/or the second RFFE 534 of FIG. 6), based on ET or APT using a power modulator (e.g., the power modulator 610, the first power modulator 612, and/or the second power modulator 614 of FIG. 6). The electronic device may perform simultaneous uplink using a plurality of bands. For example, the electronic device may perform simultaneous uplink transmission using a plurality of bands, depending on E-UTRAN new radio-dual connectivity (EN-DC), dual connectivity, uplink multi input multi output (MIMO), or carrier aggregation.

In operation 805 of flowchart 800, the processor determines whether the number of uplink resource blocks is less than a threshold value. The processor may obtain information about the number of the uplink resource blocks allocated to the electronic device, from a base station. The processor may obtain the number of uplink resource blocks by receiving uplink resource information from the base station. The threshold value may be a value stored in a memory 130. The threshold value may be a value specified by a manufacturer, a user, and/or a network of the electronic device. The threshold value may be 5.

When the number of uplink resource blocks is not less than the threshold value, the processor maintains an operating mode of the power modulator, in operation 820. For example, the processor may maintain the operating mode of the power modulator in a first mode (e.g., ET-based power control mode) or a second mode (e.g., APT-based power control mode).

When the number of uplink resource blocks is less than the threshold value, the processor determines whether the operating mode of the power modulator is a second mode (e.g., the APT-based power control mode), in operation 810.

When the operating mode of the power modulator is the second mode, the processor maintains the operating mode of the power modulator as the second mode, in operation 820. When the operating mode of the power modulator is the first mode, the processor changes the operating mode of the power modulator to the second mode (e.g., the APT-based power control mode), in operation 815.

Figure 9:
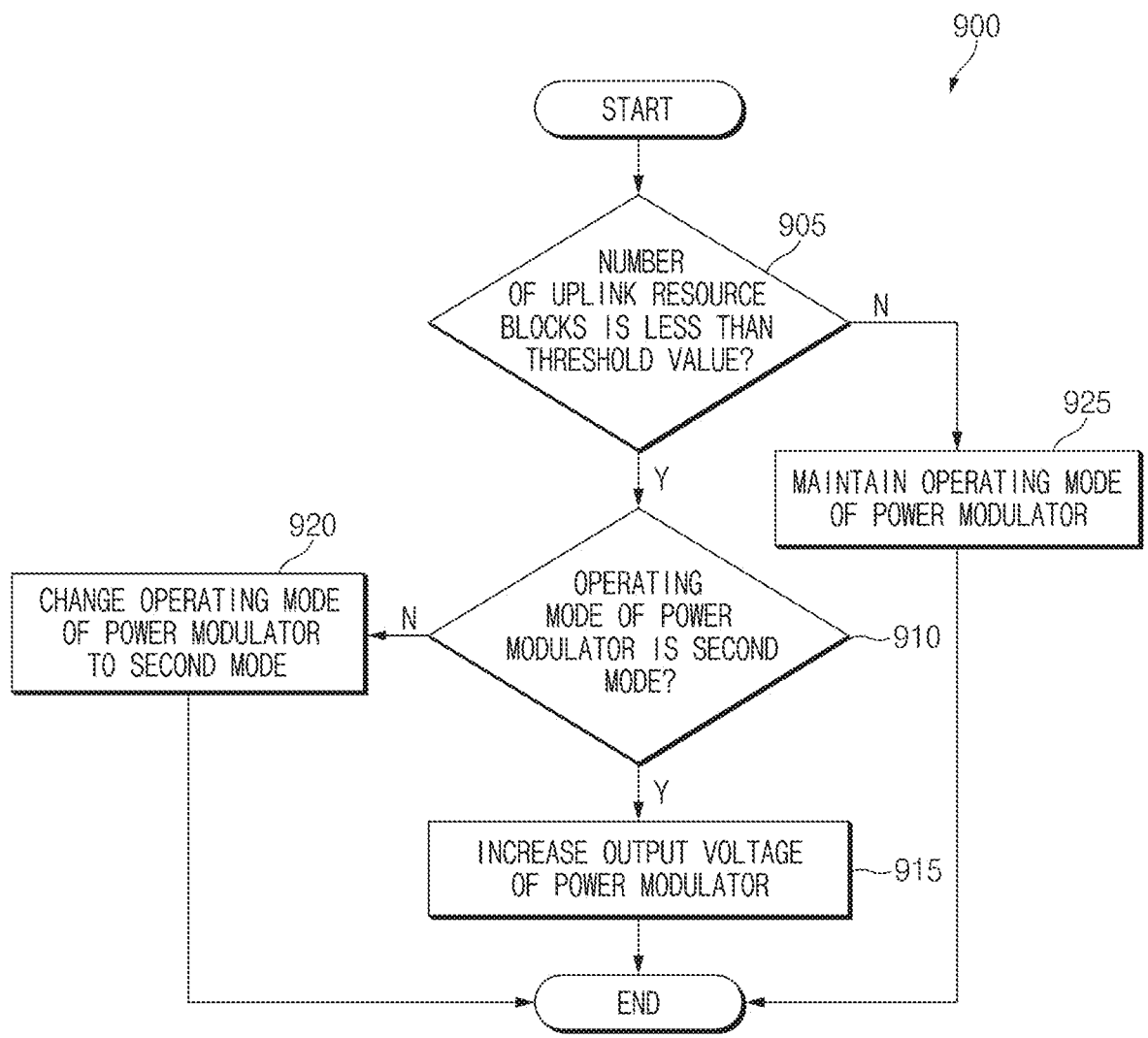
FIG. 9 is a flowchart illustrating a method of changing an operating mode of a power control circuit, according to an embodiment.

FIG. 9 is a flowchart illustrating a method of changing an operating mode of a power control circuit, according to an embodiment.

The processor (e.g., the first CP 512, and/or the second CP 514 of an electronic device 101 may perform the operations of FIG. 9. In FIG. 9, the processor of the electronic device may control the power associated with at least one communication circuit (e.g., the first RFFE 532 and/or the second RFFE 534 of FIG. 6), based on ET or APT using a power modulator (e.g., the power modulator 610, the first power modulator 612, and/or the second power modulator 614 of FIG. 6). In the example of FIG. 9, as described above with reference to FIG. 8, the electronic device may perform simultaneous uplink transmission using a plurality of uplink bands.

In operation 905 of flowchart 900, the processor determines whether the number of uplink resource blocks is less than a threshold value. Operation 905 may be similar to operation 805. When the number of uplink resource blocks is not less than the threshold value, the processor maintains an operating mode of the power modulator, in operation 925.

When the number of uplink resource blocks is less than to the threshold value, the processor determines whether the operating mode of the power modulator is a second mode (e.g., the APT-based power control mode), in operation 910.

When the operating mode of the power modulator is the second mode, the processor increases the output voltage (e.g., RFFE input voltage) of the power modulator, in operation 915. For example, the processor may add a DC offset voltage to the output voltage of the power modulator. For example, the DC offset voltage may be about 1 V.

When the operating mode of the power modulator is not the second mode (e.g., the operating mode of the power modulator is the first mode), the processor changes the operating mode of the power modulator to the second mode, in operation 920. In another example, the processor may change the operating mode of the power modulator to the second mode and may increase the output voltage of the power modulator (e.g., operation 915).

At least part of operations may be omitted from FIGS. 8 and 9. For example, the determination of the operating mode of the power modulator (e.g., operation 810 of FIG. 8 and operation 910 of FIG. 9) may be omitted. For example, when the operating mode of the power modulator is the first mode, the processor may perform the operations of FIG. 8. In this case, when the number of uplink resource blocks is less than the threshold value, the processor may change the operating mode of the power modulator to the second mode. In another example, when the operating mode of the power modulator is the second mode, the processor may perform the operations of FIG. 9. When the number of uplink resource blocks is less than the threshold value, the processor may increase the output voltage of the power modulator.

In FIGS. 8 and 9, the electronic device may reduce the maximum transmission power limit value to satisfy the maximum transmission power limit requirement, by changing the operating mode of the power modulator or adding voltage to the output voltage depending on the number of uplink resource blocks. For example, for simultaneous transmission of n41 band of E-UTRAN, the MPR requirement of the standard for the tertiary IMD may be −25 dBm. In this case, the difference between actual transmission power and maximum transmission power of the electronic device according to each power control method may be shown in Table 2 below.

TABLE 2

| Power control method | Difference (dBm) from maximum transmission power |
|---|---|
| ET | −16 |
| APT | −22 |
| APT + Voltage | −25 |

As shown in Table 2, only the ET-based power supply control may not satisfy the MPR requirement of −25 dBm. The APT-based power control may not satisfy the MPR requirement of −25 dBm, but the difference from the MPR requirement may be relatively small at −3 dBm. The MPR value to be applied to the electronic device (e.g., to satisfy the MPR requirement) may be reduced by changing the power control method. In another example, when both APT-based power control and voltage addition are simultaneously applied to the power modulator, the electronic device may satisfy the MPR requirement without applying a separate MPR. The electronic device may improve transmission performance by reducing the MPR value. The electronic device may reduce the MPR value by improving the linearity of PA associated with the power modulator through control of the power modulator.

Referring again to FIG. 5, the electronic device 101 may transmit and receive signals in a plurality of frequency bands. For example, referring to the wireless communication module 192 of reference numeral 601 of FIG. 6, the electronic device 101 may transmit a first signal using the first RFFE 532 and may receive a second signal using the second RFFE 534. The multiplication number of the first band of the first signal may correspond to the second band of the second signal.

TABLE 3

| Band | Minimum frequency (MHz) | Maximum frequency (MHz) |
|---|---|---|
| B3 | 1710 | 1785 |
| 2*B3 | 3420 | 3570 |
| B5 | 824 | 849 |
| 4*B5 | 3296 | 3396 |
| B8 | 880 | 915 |
| 4*B8 | 3300 | 3800 |
| N78 | 3300 | 3800 |

As shown in Table 3, the twofold multiplication number of band B3, the fourfold multiplication number of band B5, and the fourfold multiplication number of band B8 may overlap at least part of band N78. When the electronic device 101 transmits a signal in a band B3, B5, or B8 and simultaneously receives a signal using band N78, the sensitivity deterioration (e.g., desense) may occur in signal reception using band N78. For example, the electronic device 101 may perform backoff of LTE transmission power to reduce desense.

The frequency band available to the electronic device 101 may be set depending on the mobile network operator (MNO) of the region (e.g., country) where the electronic device 101 is located. When frequency bands may interfere with each other (e.g., generation combination of IMD or desense), the electronic device 101 may perform the above-described transmission power control and the backoff described later.

Channels (e.g., sub-frequency band) used by each MNO within a band may be different. For example, even when frequency bands interfere with each other (e.g., generation combination of IMD or desense), the electronic device 101 may perform the above-described transmission power control and the backoff described below, in consideration of the channel used by MNO. Even when frequency bands interfere with each other (e.g., generation combination of IMD or desense), the relationship between specific channels may not cause interference. When specific combinations of channels do not interfere with each other, the electronic device 101 may not perform the power backoff.

Figure 10:
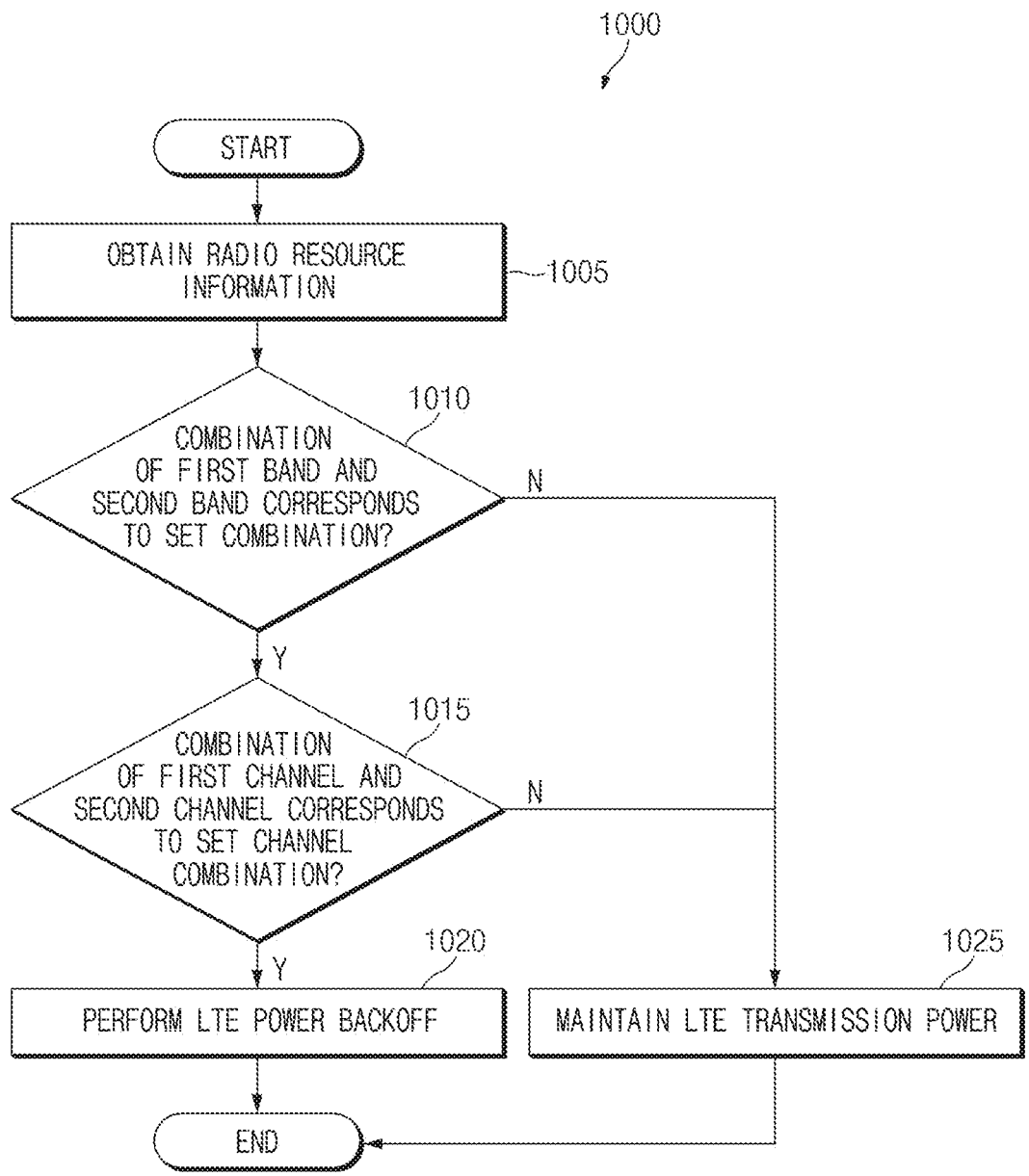
FIG. 10 is a flowchart illustrating a power backoff method, according to an embodiment.

FIG. 10 is a flowchart of a power backoff method, according to an embodiment.

The processor (e.g., the first CP 512 and/or the second CP 514 of an electronic device 101 may perform the operations of FIG. 10.

In operation 1005 of flowchart 1000, the processor obtains radio resource information. The processor may obtain the radio resource information from a network. The processor may obtain the radio resource information by receiving system information (e.g., system information block) of a base station associated (e.g., connected) with the electronic device. For example, the processor may obtain the radio resource information by obtaining band information included in system information of the base station. In another example, the processor may obtain the radio resource information, further using MNO information obtained from a public land mobile network identifier (PLMN ID) included in the system information of the base station.

In operation 1010, the processor determines whether the combination of the first band and the second band corresponds to the set band combination. The processor may determine whether the combination of the first band and the second band corresponds to the set band combination, by comparing the information stored in a memory with the received radio resource information. For example, the set band combination may be the combination of bands in each of which interference may be generated in the second band by a first band signal. The first band and the second band may be frequency bands of different RATs. In this case, the first band and the second band may be bands allocated to the electronic device according to MR-DC. In another example, the first band and the second band may be frequency bands of the same RAT. In this case, the first band and the second band may be bands set in the electronic device depending on the operation of carrier aggregation (CA) or dual connectivity.

When the combination of the first band and the second band corresponds to the configured band combination, the processor determines whether the combination of the first channel and the second channel corresponds to the set channel combination, in operation 1015. For example, the processor may obtain frequency band information of the first channel, using information about a network provider (e.g., MNO) associated with the first band of the obtained radio resource information. The processor may obtain frequency band information of the second channel of the second band, using the network provider information associated with the second band of the obtained radio resource information. Herein, a channel may mean a sub-frequency band used by the network provider for the corresponding band. When the combination of the first channel and the second channel causes mutual interference, the processor may determine that the first channel and the second channel correspond to the set channel combination. For example, the processor may obtain information of channel combinations (e.g., channel combinations capable of causing IMD or desense) from a memory. The information of channel combinations may include information of the channel combinations mapped in association with respective network provider information (e.g., MNO) and/or country information (e.g., mobile country code).

When the combination of the first band and the second band is not a combination capable of causing mutual interference, as determined in operation 1010, or when the combination of the first channel and the second channel is not a combination capable of causing mutual interference, as determined in operation 1015, the processor maintains the LTE transmission power depending, in operation 1025.

When the combination of channels allocated to the electronic device may cause mutual interference, the processor performs LTE power backoff, in operation 1020. In this case, the processor may reduce the transmission power associated with the transmission circuit of the first RFFE 532 of FIG. 6, using the power modulator. In the case of EN-DC, the desense of NR band signal reception may be reduced depending on the LTE power backoff. Accordingly, the reception throughput of the NR band signal may be increased.

Prior to operation 1010, the processor may determine whether to perform operations after operation 1010, based on the electric field state of the electronic device. For example, when the reference signal received power (RSRP) of the LTE network is less than a threshold value, the processor may maintain the LTE transmission power depending on operation 1025. The processor may prevent call drop in a weak electric field, by maintaining LTE transmission power. For another example, when the RSRP of the LTE network exceeds the threshold value, the processor may perform operation 1010.

Figure 11:
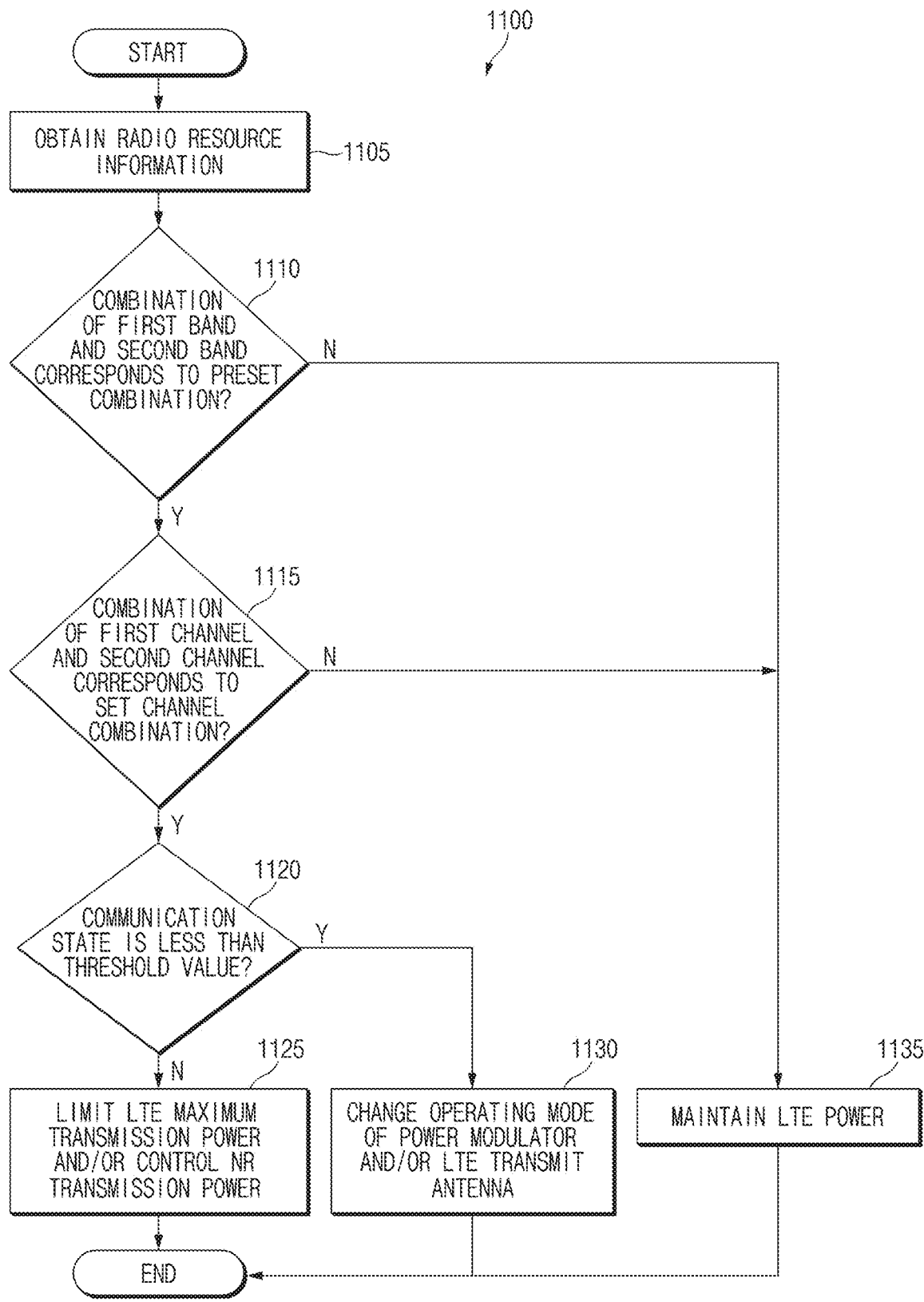
FIG. 11 is a flowchart illustrating a power control method, according to an embodiment.

FIG. 11 is a flowchart illustrating a power control method, according to an embodiment.

The processor (e.g., the first CP 512 and/or the second CP 514 of an electronic device 101) may perform the operations of FIG. 11.

In operation 1105 of flowchart 1100, the processor obtains radio resource information. Operation 1105 is similar to operation 1005 of FIG. 10.

In operation 1110, the processor determines whether the combination of the first band and the second band corresponds to the set combination. Operation 1110 is similar to operation 1010 of FIG. 10.

When the first band and the second band correspond to the set combination, the processor determines whether the combination of the first channel and the second channel corresponds to the set combination, in operation 1115. Operation 1115 is similar to operation 1015 of FIG. 10. When the band combination or the channel combination is not a combination capable of causing mutual interference, as determined by operations 1110 and 1115, LTE transmission power is maintained, in operation 1135, which is the same as operation 1025 of FIG. 10.

When the combination of first channel and the second channel corresponds to the set channel combination, the processor determines whether the communication state is less than a threshold value, in operation 1120. When the RSRP of the LTE network is less than a threshold power or when the block error rate is not less than a threshold error rate, the processor may determine that the communication state is less than a threshold value. For example, when the communication state of the electronic device is a weak electric field, the processor may determine that the communication state is less than the threshold value.

When the communication state is not less than the threshold value, the processor limits LTE maximum transmission power and/or may control NR transmission power, in operation 1125. For example, the processor may reduce LTE-related maximum transmission power. In this case, the NR data reception throughput may be increased by reducing the desense for the NR band. In another example, the processor may increase NR-related transmission power. In this case, NR data reception throughput may be increased. In yet another example, the processor may reduce LTE-related maximum transmission power and may increase NR-related transmission power. For example, in the case of the combination of band B3 and band N78, the processor may limit the maximum transmission power in band B3 to 15 dBm and may increase the maximum transmission power in band N78 to 22 dBm. For example, in the case of band B5 and band N78, the processor may limit the maximum transmission power in band B5 to 18 dBm and may increase the maximum transmission power in band N78 to 21 dBm. For example, in the case of band B8 and band N78, the processor may limit the maximum transmission power in band B8 to 18 dBm and may increase the maximum transmission power in band N78 to 21 dBm.

When the communication state is less than the threshold value, the processor changes the operating mode of the power modulator and/or the LTE transmit antenna, in operation 1130. For example, the processor may change the operating mode of the power modulator to an operating mode (e.g., the second operating mode) capable of performing APT-based power control. In this case, the desense may be reduced due to the effect similar to the power backoff (e.g., power backoff of about 6 dBm). In another example, the processor may change an LTE transmission antenna to an antenna far from the NR reception antenna. For example, when the electronic device includes a plurality of LTE transmit antennas, the processor may reduce the interference to the NR band due to the LTE signal transmission by transmitting a signal using an LTE transmit antenna located physically far from the NR receive antenna. In another example, the processor may change the operating mode of the power modulator to an APT-based power control mode and may transmit an LTE signal, using an LTE antenna far from the NR receiving antenna.

Figure 12:
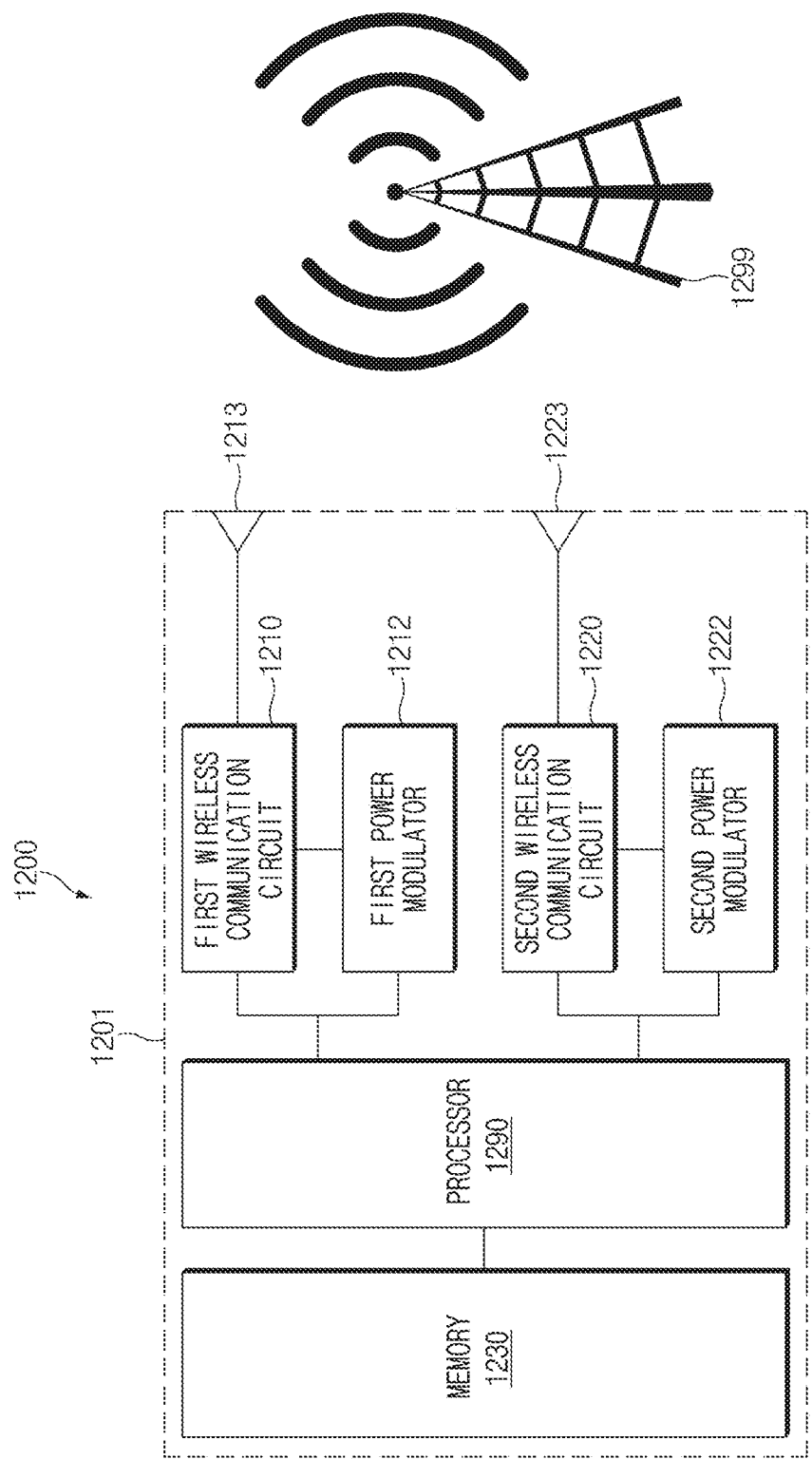
FIG. 12 is a block diagram illustrating an electronic device, according to an embodiment.

FIG. 12 is a block diagram illustrating an electronic device, according to an embodiment.

As shown in FIG. 12, an electronic device 1200 (e.g., the electronic device 101) is a terminal connected to at a base station 1299.

The electronic device 1200 includes housing 1201. The electronic device 1200 includes a first antenna 1213 and a second antenna 1223, which are positioned inside the housing 1201 or form a portion of the housing 1201. The electronic device 1200 may use at least one side of the housing 1201 as the first antenna 1213 and/or the second antenna 1223.

The electronic device 1200 includes the first wireless communication circuit 1210 (e.g., the first RFFE 532 of FIG. 6). The first wireless communication circuit 1210 may be electrically connected to the first antenna 1213 and configured to transmit and/or receive a first signal having a frequency between 500 MHz and 6 GHz. The first power modulator 1212 (e.g., the first power modulator 612 of FIG. 6) may be configured to provide power to the first wireless communication circuit 1210. For example, the first power modulator 1212 may be configured to control the power (e.g., voltage) applied to the first wireless communication circuit 1210 based on ET or APT. For example, the first wireless communication circuit 1210 may be a wireless communication circuit configured to provide E-UTRAN-based communication.

The electronic device 1200 includes a second wireless communication circuit 1220 (e.g., the second RFFE 534 of FIG. 6). The second wireless communication circuit 1220 may be electrically connected to the second antenna 1223 and configured to transmit and/or receive a second signal having a frequency between 500 MHz and 6 GHz. The second power modulator 1222 may be configured to provide power to the second wireless communication circuit 1220. The second power modulator 1222 may be configured to provide the voltage applied to the second wireless communication circuit 1220, based on ET or APT. The second wireless communication circuit 1220 may be a wireless communication circuit configured to provide next generation-radio access network (NG-RAN)-based communication in the band of 6 GHz or less.

The electronic device 1200 includes a processor 1290 (e.g., the first CP 512 and/or the second CP 514) operatively connected to the first wireless communication circuit 1210 and the second wireless communication circuit 1220 and a memory 1230 operatively connected to or coupled with the processor 1290. The memory 1230 may store one or more instructions that, when executed, cause the processor 1290 to perform various operations.

Figure 13:
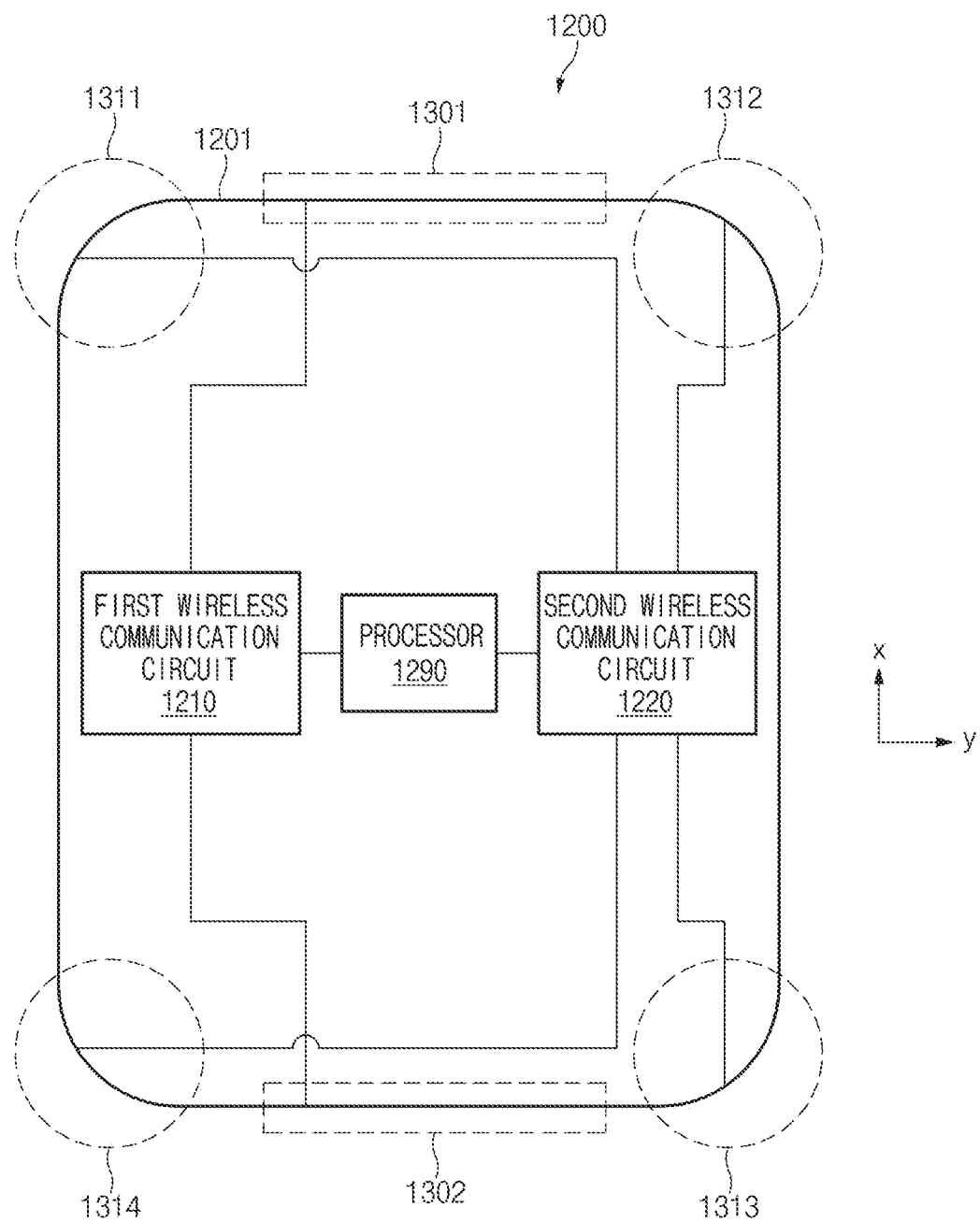
FIG. 13 is a diagram illustrating an antenna connection structure, according to an embodiment.

FIG. 13 is a diagram illustrating an antenna connection structure, according to an embodiment.

The electronic device 1200 may use at least part of the housing 1201 as an antenna 1213 of the first wireless communication circuit 1210. For example, the first wireless communication circuit 1210 may use an upper portion 1301 and a lower portion 1302 of the housing 1201 as antennas.

The electronic device 1200 may use at least part of the housing 1201 as an antenna 1223 of the second wireless communication circuit 1220. For example, the second wireless communication circuit 1210 may use the upper-side portions 1311 and 1312 of the housing 1201 as transmission antennas and may use the lower-side portions 1313 and 1314 as reception antennas.

To prevent mutual interference between the first signal of the first wireless communication circuit 1210 and the second signal of the second wireless communication circuit 1220, the electronic device 1200 may transmit and receive signals, using a physically distant antenna. For example, the first wireless communication circuit 1210 and the second wireless communication circuit 1220 may simultaneously perform uplink transmissions. In this case, to reduce mutual interference, the electronic device 1200 may transmit signals using the upper-side portions 1311 and 1312 and the lower portion 1302 as antennas. In another example, the second wireless communication circuit 1220 may receive a signal while the first wireless communication circuit 1210 transmits a signal. In this case, to reduce mutual interference, the electronic device 1200 may transmit signals using the lower-side portions 1313 and 1314 and the upper portion 1301 as antennas.

The antenna configuration of FIG. 13 is exemplary, and embodiments of the disclosure are not limited thereto. The antenna configuration of FIG. 13 is used to describe that the processor 1290 is capable of reducing interference between the first signal and the second signal, using a relatively distant antenna when the first wireless communication circuit 1210 and the second wireless communication circuit 1220 operate at the same time. Herein, the number and locations of antennas of the electronic device 1200 are not limited to that shown in FIG. 13.

Hereinafter, various operations of the electronic device 1200 will be described based on the structure of the electronic device 1200 of FIG. 12 with reference to FIGS. 14 and 15.

Figure 14:
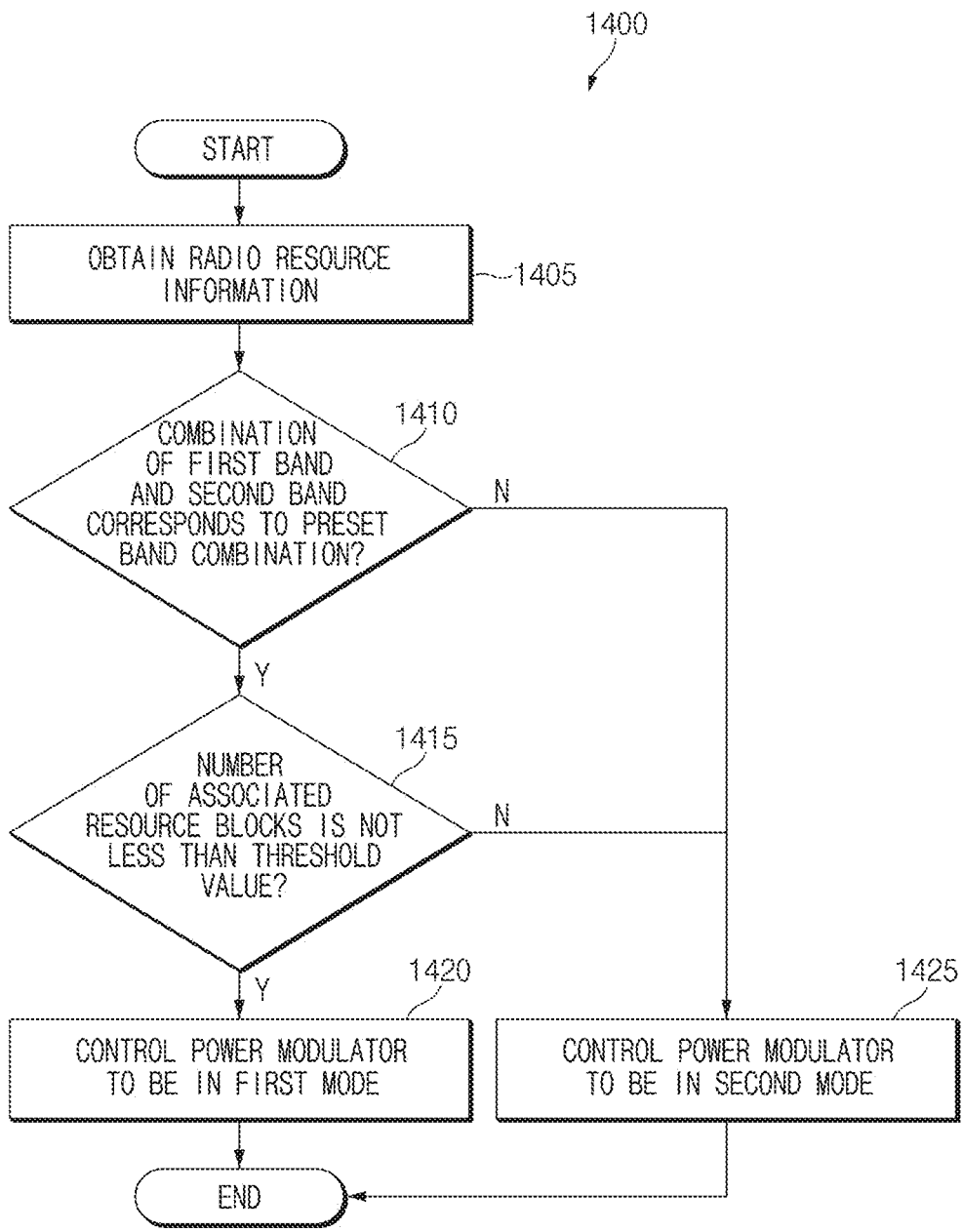
FIG. 14 is a flowchart illustrating a transmission power control method, according to an embodiment.

FIG. 14 is a flowchart illustrating a power control method, according to an embodiment.

In operation 1405 of flowchart 1400, the processor 1290 obtains radio resource information. For example, the processor 1290 may obtain radio resource information from the connected base station 1299. The processor 1290 may obtain the radio resource information by receiving uplink resource information and/or system information block from the base station 1299. The radio resource information may include the number of uplink resource blocks allocated to the electronic device 1200 and/or information about a frequency band associated with a base station to which the electronic device 1200 is connected.

In operation 1410, the processor 1290 determines whether the combination of the first band and the second band corresponds to the set band combination. The first band is a frequency band in which the processor 1290 communicates with a network using the first wireless communication circuit 1210. The second band may be a frequency band in which the processor 1290 communicates with the network using the second wireless communication circuit 1220. The first band and the second band may be bands associated with a plurality of base stations to which the electronic device is connected. The first band and the second band may be a plurality of bands associated with the base station to which the electronic device is connected. The processor 1290 may determine whether the combination of the first band and the second band corresponds to the set band combination, by comparing the information of the frequency band combinations stored in the memory 1230 with the information of the first band and the second band indicated by the radio resource information. For example, the set band combination may be a combination in which the multiplication number of the first band overlaps with at least part of the second band. The set band combination may be a frequency band combination in which interference (e.g., IMD or desense) may occur between the first band and the second band. The set band combination may be a frequency band combination in which interference may occur among EN-DC band combinations configured to use FDD.

When the combination of the first band and the second band corresponds to the preset band combination, the processor 1290 determines whether the number of uplink resource blocks allocated to the electronic device 1200 is not less than a threshold value, in operation 1415. For example, the processor 1290 may obtain information about the number of allocated uplink resource blocks from radio resource information (e.g., uplink resource allocation information).

When the number of uplink resource blocks is not less than the threshold value, the processor 1290 controls the first power modulator 1212 and the second power modulator 1222 to be in a first mode (e.g., an ET-based power control mode), in operation 1420. Through ET-based power control, the processor 1290 may reduce power consumption of the electronic device 1200.

When the combination of the first band and the second band does not correspond to the preset band combination, as determined in operation 1410, or when the number of associated resource blocks is less than the threshold value, the processor 1290 controls the first power modulator 1212 and/or the second power modulator 1222 to be in a second mode (e.g., an APT-based power control mode), in operation 1425. Through power control based on APT, for example, the processor 1290 may reduce the amount of MPR associated with a wireless communication circuit (e.g., the first wireless communication circuit 1210 and/or the second wireless communication circuit 1220), thereby reducing degradation of communication quality. For example, as described above with respect to operation 915 of FIG. 9, the processor 1290 may control the first power modulator 1212 and/or the second power modulator 1222 to be in the second mode and may increase the output voltage of the first power modulator 1212 and/or the second power modulator 1222.

Figure 15:
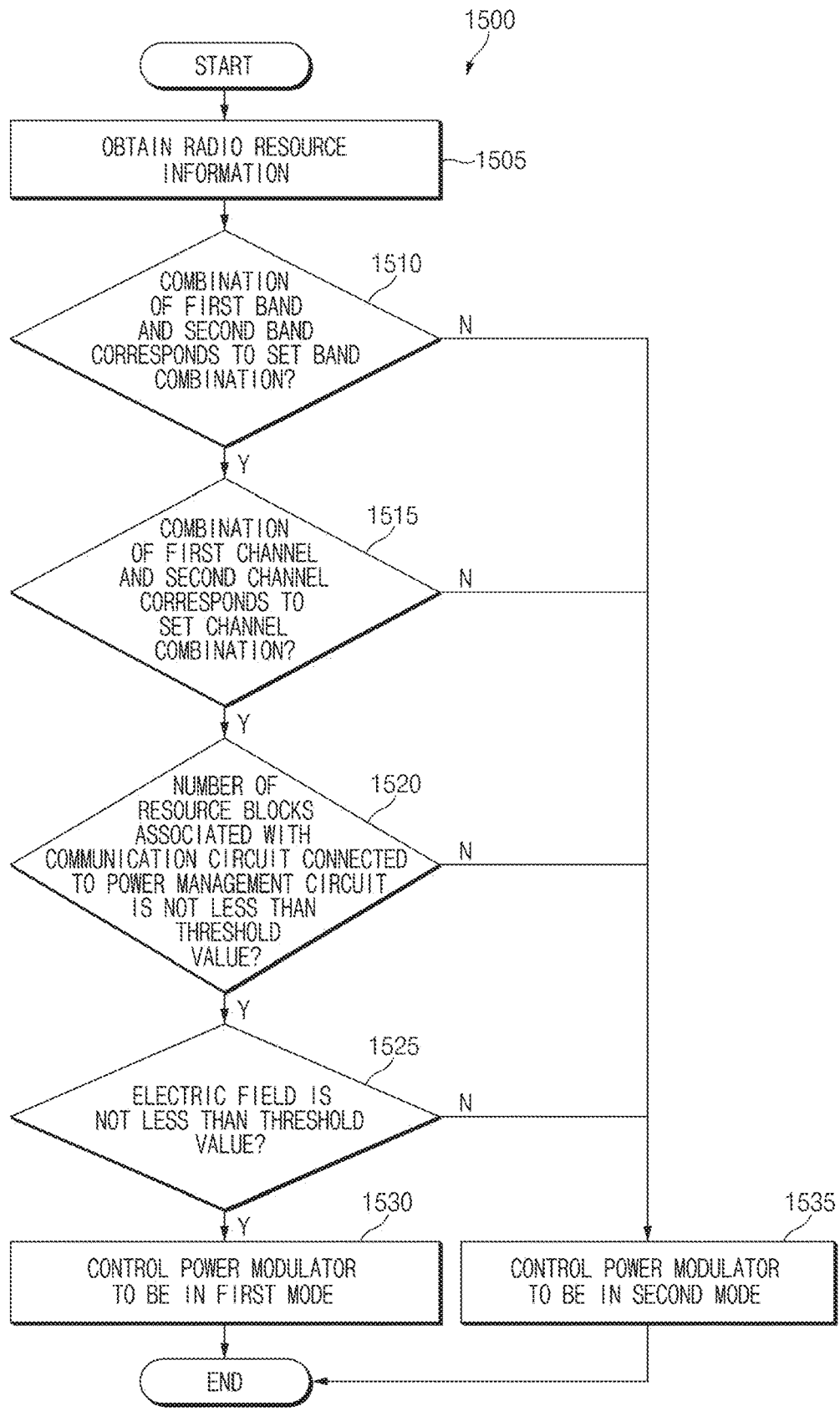
FIG. 15 is a flowchart illustrating a transmission power control method, according to an embodiment.

FIG. 15 is a flowchart of a power control method, according to an embodiment.

In operation 1505 of flowchart 1500, the processor 1290 obtains radio resource information. Operation 1505 is similar to operation 1405 of FIG. 14.

In operation 1510, the processor 1290 determines whether the combination of the first band and the second band corresponds to the set band combination. Operation 1510 is similar to operation 1410 of FIG. 4.

When the combination of the first band and the second band corresponds to the set band combination, the processor 1290 determines whether the combination of the first channel of the first band and the second channel of the second band corresponds to the set channel combination, in operation 1515. The processor may determine whether the combination of the first channel and the second channel corresponds to the set channel combination. For example, the processor 1290 may obtain frequency band information of the first channel, using information about a network provider (e.g., MNO) associated with the first band of the obtained radio resource information (e.g., system information). The processor 1290 may obtain frequency band information of the second channel of the second band, using the network provider information associated with the second band of the obtained radio resource information. When the combination of the first channel and the second channel causes mutual interference, the processor 1290 may determine that the first channel and the second channel correspond to the set channel combination. For example, the processor 1290 may obtain information of channel combinations (e.g., channel combinations capable of causing IMD or Desense) from the memory 1230. The information of channel combinations may include information of the channel combinations mapped in association with respective network provider information (e.g., MNO) and/or country information (e.g., mobile country code).

When the combination of the first channel and the second channel corresponds to the set channel combination, the processor 1290 determines whether the number of resource blocks allocated to the electronic device 1200 is not less than a threshold value (e.g., five), in operation 1520. Operation 1520 is similar to operation 1415 of FIG. 14.

When the number of resource blocks is not less than the threshold value, the processor 1290 determines whether the electric field is not less than the threshold value, in operation 1525. For example, the processor 1290 may identify an electric field based on RSRP received from the base station 1299. In this case, when the RSRP is less than a threshold power, the processor 1290 may determine that the electric field is less than the threshold value. In another example, the processor 1290 may identify the electric field based on the error rate of the data received from the base station 1299. In this case, when the error rate of the received data is not less than a threshold error rate, the processor 1290 may determine that the electric field is not less than a threshold value.

When the electric field is not less than the threshold value, the processor 1290 controls the second power modulator 1222 to be in a first mode (e.g., ET-based transmission power control), in operation 1530. For example, the processor 1290 may control the second power modulator 1222 to be in the first mode. In operation 1530, the processor 1290 may limit the maximum transmission power of the first wireless communication circuit 1210 (e.g., operation 1020 of FIG. 10 or operation 1125 of FIG. 11). The processor 1290 may control the second power modulator 1222 to be in the first mode and may increase the output of the second wireless communication circuit 1220. For example, when the communication state is good, the processor 1290 may reduce LTE transmission power to prevent desense and may increase NR transmission power to increase NR data throughput.

When the combination of bands does not correspond to the set band combination, as determined in operation 1510, when the combination of channels does not correspond to the set channel combination, as determined in operation 1515, when the number of resource blocks is less than the threshold value, as determined in operation 1520, or the electric field is less than a threshold value, as determined in operation 1525, the processor 1290 controls the second power modulator 1222 to be in the second mode (e.g., APT-based transmission power control), in operation 1535. The processor 1290 may control the first power modulator 1212 and the second power modulator to be in the second mode. For example, the processor 1290 may increase (e.g., add a DC offset) the output voltage of the first power modulator 1212 and/or the second power modulator 1222. The processor 1290 may transmit a signal, using an antenna physically located far from the antenna (e.g., a reception antenna used when the second wireless communication circuit 1220 receives a signal or a transmission antenna used when the second wireless communication circuit 1220 transmits a signal) associated with the second power modulator 1222 among the plurality of antennas associated with the first power modulator 1212.

According to an embodiment, an electronic device may include housing. The electronic device may include a first antenna and a second antenna, which are positioned inside the housing or form a portion of the housing. The electronic device may include a first power amplifier electrically connected to the first antenna and configured to transmit and/or receive a first signal having a frequency of 500 MHz and 6 GHz and a first wireless communication circuit including a first power modulator providing the first power amplifier with a voltage. The electronic device may include a second power amplifier electrically connected to the second antenna and configured to transmit and/or receive a second signal having a frequency of 500 MHz and 6 GHz and a second wireless communication circuit including a second power modulator providing the second power amplifier with a voltage. The electronic device may include, for example, at least one processor operatively connected to the first wireless communication circuit and the second wireless communication circuit and at least one memory operatively connected to the processor or coupled with the processor. The memory may store instructions that, when executed, cause the processor to receive information about a first transmission resource block associated with the first wireless communication circuit and/or a second transmission resource block associated with the second wireless communication circuit from a cellular base station through the first wireless communication circuit and/or the second wireless communication circuit while the first power modulator and/or the second power modulator uses ET, and to control the first power modulator and/or the second power modulator, using APT instead of the ET based at least partly on the received information.

The instructions may cause the processor to reduce the MPR value of at least one of the first wireless communication circuit or the second wireless communication circuit based at least partly on the received information, while satisfying MPR specification of 3GGP standard.

The memory may store instructions that, when executed, cause the processor to receive information about a first transmission resource block associated with the first wireless communication circuit and/or a second transmission resource block associated with the second wireless communication circuit from a cellular base station through the first wireless communication circuit and/or the second wireless communication circuit while the first power modulator and/or the second power modulator operate at the same time and at least one of the first power modulator and/or the second power modulator uses ET, and to change the voltage of the APT based at least partly on the received information.

The memory may store instructions that, when executed, cause the processor to check a lookup table associated with the interference between a frequency of the first signal and a frequency of the second signal when the strength of the second signal is less than a threshold, and to reduce power output through the second power amplifier by the selected magnitude based on the checked result.

The memory may store instructions that, when executed, cause the at least one processor to receive uplink resource information allocated to the electronic device from a base station via the first wireless communication circuit, and to cause at least one power modulator, from among the first power modulator and the second power modulator, to provide a voltage based on the APT, based on at least the number of uplink resource blocks indicated by the uplink resource information.

The one or more instructions may, when executed, cause the at least one processor to control the at least one power modulator to provide the voltage based on the APT, when the number of uplink resource blocks is less than a defined number. For example, the one or more instructions may, when executed, cause the at least one processor to add an offset voltage to an output voltage of at least one power modulator the first power modulator or the second power modulator, when the number of uplink resource blocks is less than the defined number.

For example, the first wireless communication circuit may be configured to transmit and/or receive a long term evolution (LTE)-based wireless signal; the second wireless communication circuit may be configured to transmit and/or receive a new radio (NR)-based wireless signal.

The one or more instructions may, when executed, cause the at least one processor to obtain information about a first frequency band associated with the first wireless communication circuit and information about a second frequency band associated with the second wireless communication circuit, and to control the at least one power modulator to provide the voltage based on the APT when a multiple of the first frequency band overlaps with at least part of the second frequency band.

The one or more instructions may, when executed, cause the at least one processor to obtain information about a first frequency band associated with the first wireless communication circuit and information about a second frequency band associated with the second wireless communication circuit, to determine whether a multiple of a first channel associated with the first wireless communication circuit in the first frequency band at least partially overlaps with a band of a second channel associated with the second wireless communication circuit in the second frequency band when a multiple of the first frequency band overlaps with at least part of the second frequency band, and to control the at least one power modulator to provide the power based on the APT when the multiple of the first channel at least partially overlaps with the band of the second channel.

For example, the one or more instructions may, when executed, cause the at least one processor to obtain first frequency band information of the first channel and frequency band information of the second channel, using first channel information of a first network provider associated with the first frequency band and second channel information of a second network provider associated with the second frequency band.

The one or more instructions may, when executed, cause the at least one processor to identify an electric field associated with the first wireless communication circuit when the number of uplink resource blocks is greater than or equal to a defined number, and to cause the second power modulator to provide a voltage based on the ET and to reduce a maximum transmission power of the first wireless communication circuit when the identified electric field is greater than or equal to a threshold value. For example, the one or more instructions may, when executed, cause the at least one processor to identify the electric field associated with the first wireless communication circuit when the number of uplink resource blocks is greater than or equal to than the defined number, and to control the first power modulator and the second power modulator to provide the voltage based on the APT when the identified electric field is less than the threshold value.

The one or more instructions may, when executed, cause the at least one processor to add an offset voltage to an output voltage of the second power modulator when the identified electric field is less than the threshold value.

According to an embodiment, a method provided for controlling power of an electronic device includes receiving uplink resource information allocated to the electronic device from a base station, via a first wireless communication circuit configured to transmit and/or receive a first signal of 6 GHz or less, and controlling, via a power modulator of the electronic device, a power of at least one wireless communication circuit, from among the first wireless communication circuit and a second wireless communication circuit configured to transmit and/or receive a second signal of 6 GHz or less, with APT based on at least the number of uplink resource blocks indicated by the uplink resource information.

Controlling the power providing method with the APT may include controlling the power of the at least one wireless communication circuit, based on the APT when the number of uplink resource blocks is less than a defined number.

Controlling the power may further include adding an offset voltage to an output voltage of the power modulator of the at least one wireless communication circuit.

The first wireless communication circuit may be configured to transmit and/or receive a LTE-based wireless signal; the second wireless communication circuit may be configured to transmit and/or receive a NR-based wireless signal.

According to various embodiments disclosed herein, an electronic device may reduce communication quality degradation by reducing the maximum power reduction (MPR) value.

According to various embodiments disclosed herein, the electronic device may increase data throughput by improving transmission or reception performance.

A variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   a first antenna;
   a second antenna;
   a first wireless communication circuit electrically connected to the first antenna and configured to transmit and/or receive a first signal having a first frequency between 500 MHz and 6 GHz;
   a first power modulator included in the first wireless communication circuit or connected to the first wireless communication circuit, and configured to provide the first wireless communication circuit with a first voltage based on envelope tracking (ET) or average power tracking (APT);
   a second wireless communication circuit electrically connected to the second antenna and configured to transmit and/or receive a second signal having a second frequency between 500 MHz and 6 GHz;
   a second power modulator included in the second wireless communication circuit or connected to the second wireless communication circuit and configured to provide the second wireless communication circuit with a second voltage based on the ET or the APT;
   at least one processor operatively connected to the first wireless communication circuit and the second wireless communication circuit; and
   a memory operatively connected to the at least one processor or coupled with the at least one processor,
   wherein the memory stores one or more instructions that, when executed, cause the at least one processor to:
      receive uplink resource information allocated to the electronic device from a base station, via the first wireless communication circuit;
      cause at least one power modulator, from among the first power modulator and the second power modulator, to provide a voltage based on the APT, based on a number of uplink resource blocks indicated by the uplink resource information;
      obtain information about a first frequency band associated with the first wireless communication circuit and information about a second frequency band associated with the second wireless communication circuit;
      when a multiple of the first frequency band overlaps with at least part of the second frequency band, determine whether a multiple of a first channel associated with the first wireless communication circuit in the first frequency band at least partially overlaps with a band of a second channel associated with the second wireless communication circuit in the second frequency band; and
      when the multiple of the first channel at least partly overlaps with the band of the second channel, control the at least one power modulator to provide the power based on the APT.

2. The electronic device of claim 1, wherein the one or more instructions, when executed, further cause the at least one processor to:
   obtain first frequency band information of the first channel and second frequency band information of the second channel, using first channel information of a first network provider associated with the first frequency band and second channel information of a second network provider associated with the second frequency band.

3. The electronic device of claim 1,
   wherein controlling the power comprises:
      when a number of uplink resource blocks is less than a threshold value and the multiple of the first channel at least partially overlaps with the band of the second channel, changing the power providing method of the power modulator of the at least one wireless communication circuit into the APT.

4. The electronic device of claim 1, wherein the one ore more instructions, when executed, cause the at least one processor to:
   when the number of uplink resource blocks is less than a threshold value and the multiple of the first channel at least partially overlaps with the band of the second channel, change the power providing method of the power modulator of the at least one wireless communication circuit into the APT.

5. The electronic device of claim 1, wherein the one or more instructions, when executed, cause the at least one processor to:
   when the identified electric field is greater than or equal to a threshold value, control a power providing method of the second power modulator included in the second wireless communication circuit with an ET and reduce a maximum transmission power of the first wireless communication circuit.

6. The electronic device of claim 5, wherein:
   when the identified electric field is less than the threshold value, the one or more instructions, when executed, cause the at least one processor to control the power based on the APT.

7. The electronic device of claim 6, wherein:
   when the identified electric field is less than the threshold value, the one or more instructions, when executed, cause the at least one processor to add an offset voltage to an output voltage of the second power modulator.

8. An electronic device comprising:
   a housing;
   a first antenna;
   a second antenna;
   a first wireless communication circuit electrically connected to the first antenna and configured to transmit and/or receive a first signal having a first frequency between 500 MHz and 6 GHz;
   a first power modulator included in the first wireless communication circuit or connected to the first wireless communication circuit, and configured to provide the first wireless communication circuit with a first voltage based on envelope tracking (ET) or average power tracking (APT);
   a second wireless communication circuit electrically connected to the second antenna and configured to transmit and/or receive a second signal having a second frequency between 500 MHz and 6 GHz;
   a second power modulator included in the second wireless communication circuit or connected to the second wireless communication circuit and configured to provide the second wireless communication circuit with a second voltage based on the ET or the APT;

at least one processor operatively connected to the first wireless communication circuit and the second wireless communication circuit; and a memory operatively connected to the at least one processor or coupled with the at least one processor, wherein the memory stores one or more instructions that, when executed, cause the at least one processor to:

receive uplink resource information allocated to the electronic device from a base station, via the first wireless communication circuit;

cause at least one power modulator, from among the first power modulator and the second power modulator, to provide a voltage based on the APT, based on a number of uplink resource blocks indicated by the uplink resource information;

when the number of uplink resource blocks is greater than or equal to a defined number, identify an electric field associated with the first wireless communication circuit; and when the identified electric field is greater than or equal to a threshold value, cause the second power modulator to provide a voltage based on the ET and to reduce a maximum transmission power of the first wireless communication circuit.

9. The electronic device of claim 8, wherein the one or more instructions, when executed, further cause the at least one processor to:

when the number of uplink resource blocks is greater than or equal to the defined number, identify the electric field associated with the first wireless communication circuit; and when the identified electric field is less than the threshold value, control the first power modulator and the second power modulator to provide the voltage based on the APT.

10. The electronic device of claim 9, wherein the one or more instructions, when executed, further cause the at least one processor to:

when the identified electric field is less than the threshold value, add an offset voltage to an output voltage of the second power modulator.

* * * * *